(12) United States Patent
Shiraishi

(10) Patent No.: US 9,377,609 B2
(45) Date of Patent: Jun. 28, 2016

(54) IMAGING ELEMENT ARRAY AND IMAGE FORMING APPARATUS

(71) Applicant: TOSHIBA TEC KABUSHIKI KAISHA, Tokyo (JP)

(72) Inventor: Takashi Shiraishi, Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 141 days.

(21) Appl. No.: 14/162,583

(22) Filed: Jan. 23, 2014

(65) Prior Publication Data

US 2014/0204474 A1 Jul. 24, 2014

(30) Foreign Application Priority Data

Jan. 23, 2013 (JP) .................................. 2013-010089

(51) Int. Cl.
| | |
|---|---|
| G02B 17/00 | (2006.01) |
| G02B 5/08 | (2006.01) |
| G02B 17/08 | (2006.01) |
| G02B 5/10 | (2006.01) |
| G02B 5/22 | (2006.01) |
| G03G 13/04 | (2006.01) |
| G03G 15/043 | (2006.01) |

(52) U.S. Cl.
CPC ........ *G02B 17/08* (2013.01); *G02B 5/10* (2013.01); *G02B 5/22* (2013.01); *G03G 13/04* (2013.01); *G03G 15/0435* (2013.01)

(58) Field of Classification Search
CPC ............ G02B 17/08; G02B 5/10; G02B 5/22; G03G 13/04; G03G 15/0435
USPC .................... 359/196.1, 201.2, 726, 850
See application file for complete search history.

(56) References Cited

U.S. PATENT DOCUMENTS

| | | | | |
|---|---|---|---|---|
| 2004/0218293 | A1* | 11/2004 | Huibers ....................... | 359/850 |
| 2007/0291386 | A1* | 12/2007 | Yoshikawa et al. ........... | 359/885 |
| 2010/0097679 | A1* | 4/2010 | Hirakawa .................. | 359/201.2 |

(Continued)

FOREIGN PATENT DOCUMENTS

| | | |
|---|---|---|
| JP | S61-210319 A | 9/1986 |
| JP | 2002-062407 A | 2/2002 |

(Continued)

OTHER PUBLICATIONS

Japanese Office Action dated Mar. 24, 2015 in counterpart Japanese Patent Application 2013-010089 with English translation.

*Primary Examiner* — Bumsuk Won
*Assistant Examiner* — Grant Gagnon
(74) *Attorney, Agent, or Firm* — Patterson & Sheridan, LLP

(57) ABSTRACT

An imaging element array includes a plurality of imaging elements that are arranged side by side. Each imaging element is integrally molded and includes an incident surface, an emission surface, and a plurality of reflective surfaces which is provided between the incident surface and the emission surface. The imaging element includes a first reflective element. In the first reflective element, at least one of the plurality of reflective surfaces is formed on a top of a convex portion which protrudes outwardly and has reflective sidewalls extending therefrom. In the first reflective element, a width of the reflective surface, which is formed on the top of the convex portion, in an arrangement direction thereof is less than a distance from an entrance into the concave portion to the top of the convex surface.

20 Claims, 26 Drawing Sheets

(56) References Cited

U.S. PATENT DOCUMENTS

2012/0188615 A1* 7/2012 Takeda .......................... 358/475
2013/0100514 A1 4/2013 Shiraishi
2013/0314754 A1 11/2013 Shiraishi

FOREIGN PATENT DOCUMENTS

JP 2002-169092 A 6/2002
JP 2006-062227 A 3/2006

* cited by examiner

MAIN-SCANNING
DIRECTION

MAIN-SCANNING
DIRECTION

MAIN-SCANNING
DIRECTION

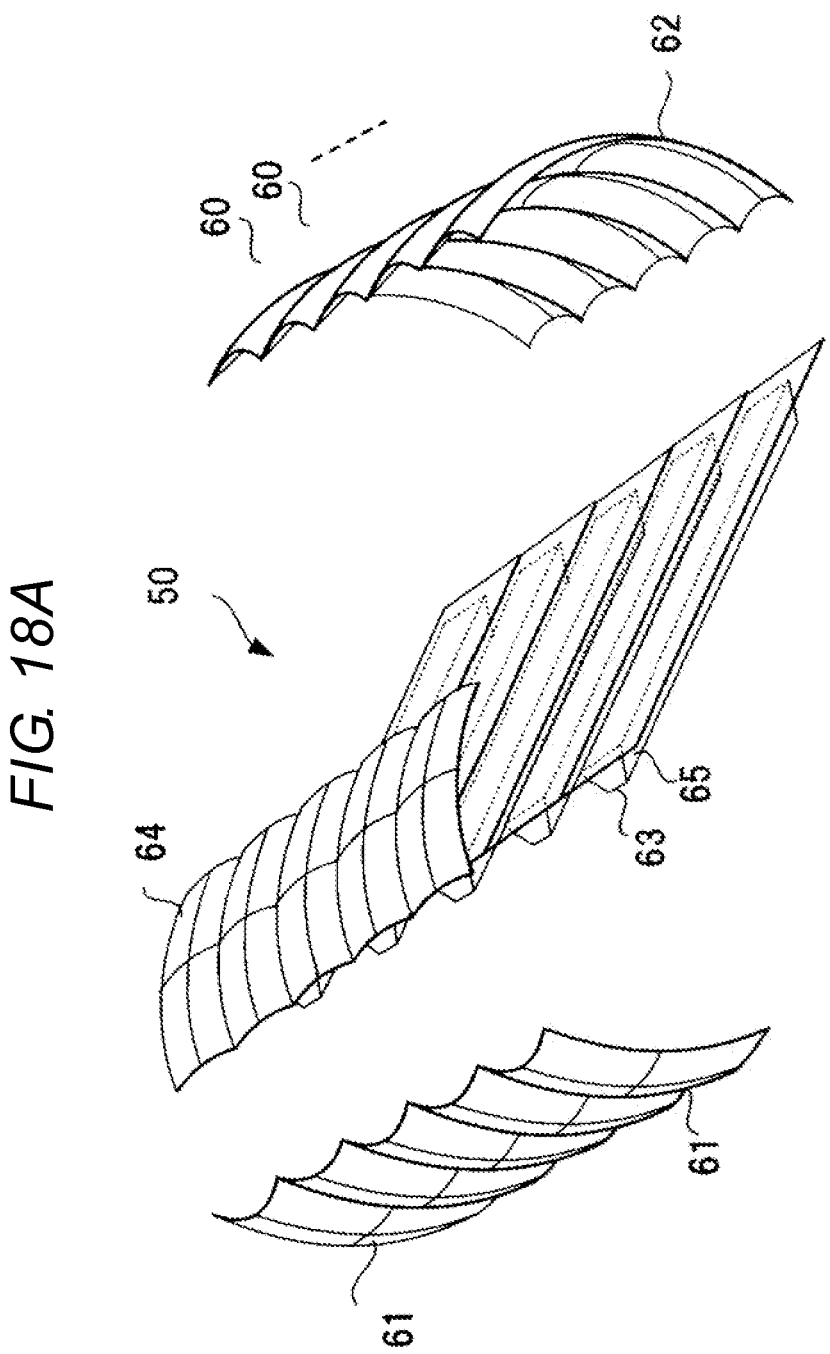

IMAGING ELEMENT ARRAY AND IMAGE FORMING APPARATUS

CROSS-REFERENCE TO RELATED APPLICATION

This application is based upon and claims the benefit of priority from Japanese Patent Application No. 2013-010089, filed Jan. 23, 2013, the entire contents of which are incorporated herein by reference.

FIELD

Embodiments described herein relate generally to an imaging element array configured with lenses and mirrors, and an image forming apparatus using the imaging element array.

BACKGROUND

In the related art, an image forming apparatus such as a scanner, a copying machine, or a multi-function peripheral (MFP) includes an image sensor to read an image of a document (document image) using an illumination device and a lens array in which plural lenses are arranged. In addition, in the image forming apparatus such as a printer, a copying machine, or a multi-function peripheral (MFP), by using an light emitting element such as an LED and a lens array, light rays emitted from the LED are imaged on a photoconductor drum through the lens array, and the image is formed (exposed) on the photoconductor drum. The lens array is formed, for example, by combining plural lenses and apertures.

However, in such a lens array, when the optical axes between lenses through which one light ray passes deviate from each other, imaging characteristics deteriorate and non-uniformity in light intensity can become severe. In addition, when plural lenses and other optical path elements such as apertures are combined, misalignments among the elements during assembly causes deterioration in imaging and printing performance.

JP-A-2002-62407 discloses an imaging element array in which imaging elements are combined to avoid deterioration in performance caused by misalignment during assembly. However, since there are two reflective surfaces in the disclosed device at a position where a light flux width is wide, surface accuracy has an effect on image formation. Therefore, there is a problem in that it is necessary to increase the time needed to mold the lens assembly so that a desired surface accuracy can be achieved.

DESCRIPTION OF THE DRAWINGS

FIGS. 18A and 18B are diagrams illustrating a configuration of a modified imaging element array according to a first embodiment.

DETAILED DESCRIPTION

Figure 1:
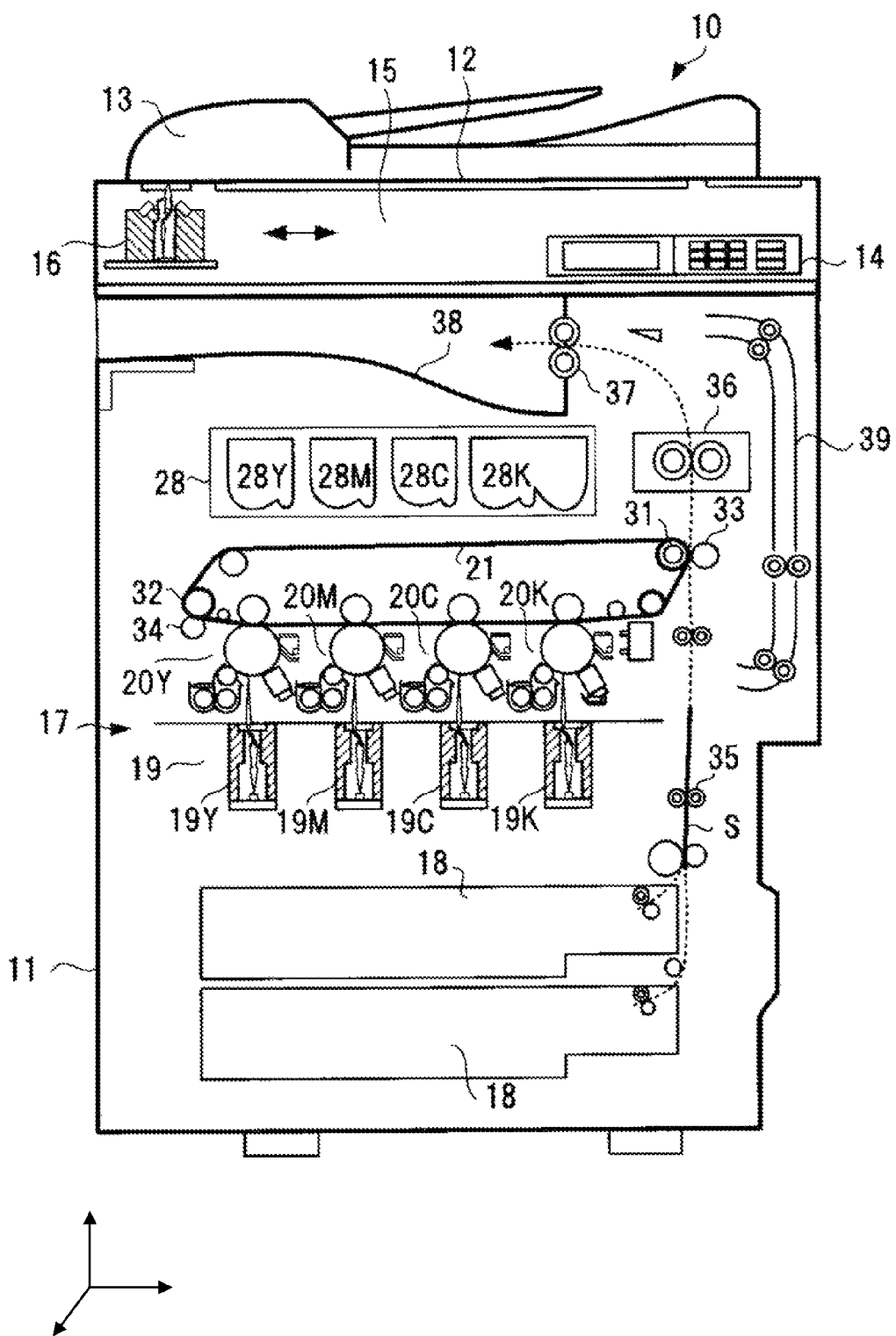
FIG. 1 is a diagram illustrating a configuration of an image forming apparatus according to an embodiment.

According to the present exemplary embodiments, it is possible to provide an imaging element array that can suppress a deviation in relative position between a lens and a mirror arranged in a light path and can be molded as a single body molded product, and to provide an image forming apparatus using the imaging element array.

In general, according to one embodiment, there is provided an imaging element array including a plurality of imaging elements that are arranged side by side. Each imaging element is integrally molded and includes an incident surface, an emission surface, and a plurality of reflective surfaces which are provided between the incident surface and the emission surface. The imaging element includes a first reflective element. In the first reflective element, at least one of the plurality of reflective surfaces is formed on a top of a convex portion which protrudes outwardly from the body of the imaging element. At the first reflective element, a width of the reflective surface, which is formed on the top of the convex portion, in the width direction thereof, is less than the distance from the entrance into the concave portion to the top of the convex surface.

Hereinafter, the embodiments will be described with reference to the drawings. In the drawings, the same component will be represented by the same reference numeral.

First Embodiment

FIG. 1 is a diagram illustrating a configuration of an image forming apparatus using an imaging element array according to one embodiment. In FIG. 1, an image forming apparatus 10 is, for example, a multi-function peripheral (MFP), a printer, or a copying machine. In the following description, an MFP will be described as an example.

A document plate 12 made of transparent glass is provided above a main body 11 of the MFP 10, and an automatic document feeder (ADF) 13 is openably provided on the document plate 12. In addition, an operation panel 14 is provided above the main body 11. The operation panel 14 includes various keys and a touch panel type display unit.

A scanner unit 15 which is a reading device is provided below the ADF 13 in the main body 11. The scanner unit 15 reads the image on a document fed past the scanner unit 15 by the ADF 13, or reads the image on a document placed on the document plate 12 to generate image data by scanning thereunder, and includes a contact image sensor 16 (hereinafter, simply referred to as "image sensor"). The image sensor 16 is arranged in a main-scanning direction (depth direction in FIG. 1).

When reading an image of a document placed on the document plate 12, the image sensor 16 reads the document by moving under the document plate 12 while illuminating the document. This operation is performed over the entire document to read a document image corresponding to one page. In addition, when reading an image of a document fed by the ADF 13, the image sensor 16 is positioned at a fixed position (position illustrated in the drawing), while the ADF 13 moves the document past the image sensor 16.

Further, a printer unit 17 is provided at the center of the main body 11, and plural cassettes 18 for accommodating various sizes of sheets are provided in a lower portion of the main body 11. The printer unit 17 includes a photoconductor drum and an optical scanning device for exposing the photoconductor drum. The optical scanning unit includes a scanning head 19 including an LED as a light emitting element and scans a photoreceptor with light rays emitted from the scanning head 19 to form an image.

The printer unit 17 processes image data read by the scanner unit 15 or image data created by a personal computer (PC) or the like to form an image on a sheet which provides a recording medium. The printer unit 17 is, for example, a tandem type color laser printer and includes image forming units 20Y, 20M, 20C, and 20K of various colors including yellow (Y), magenta (M), cyan (C), and black (K).

The image forming units 20Y, 20M, 20C, and 20K are arranged side by side below an intermediate transfer belt 21 in a direction from an upstream side to a downstream side of the belt feed direction. In addition, the scanning head 19 includes plural scanning heads 19Y, 19M, 19C, and 19K corresponding to the image forming units 20Y, 20M, 20C, and 20K.

Figure 2:
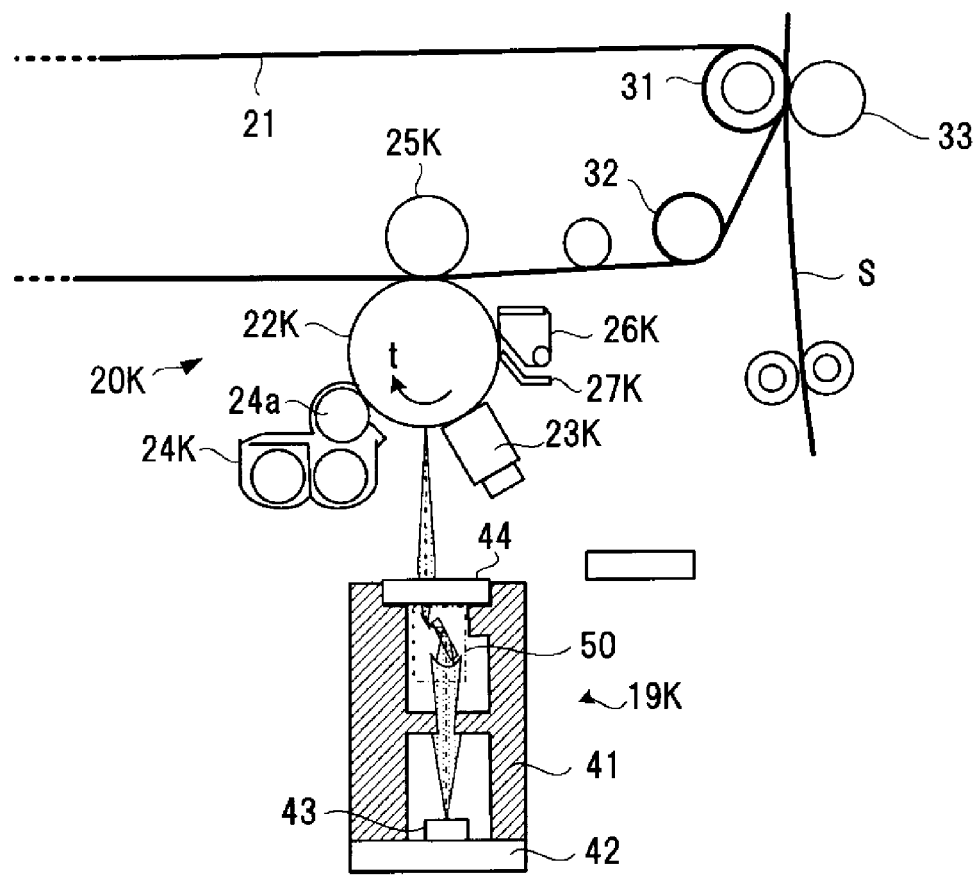
FIG. 2 is an enlarged diagram illustrating a configuration of an image forming unit according to the embodiment.

FIG. 2 is an enlarged diagram illustrating the image forming unit 20K as among the image forming units 20Y, 20M, 20C, and 20K. In the following description, the image forming unit 20K will be representatively described because the image forming units 20Y, 20M, 20C, and 20K have the same configuration.

As illustrated in FIG. 2, the image forming unit 20K includes a photoconductor drum 22K which is an image receiving and transferring member. In the vicinity of the photoconductor drum 22K, an electric charger 23K, a developing unit 24K, a primary transfer roller 25K, a cleaner 26K, a blade 27K, and the like are arranged along a rotation direction t. An exposure position of the photoconductor drum 22K is irradiated with light from the scanning head 19K, and an electrostatic latent image is thus written onto the photoconductor drum 22K.

The electric charger 23K of the image forming unit 20K uniformly charges a surface of the photoconductor drum 22K.

The developing unit 24K supplies a two-component developer including a black toner and a carrier to the photoconductor drum 22K to form a toner image on the photoconductor drum 22K using a developing roller 24a to which a developing bias is applied. The cleaner 26K removes toner, remaining on the surface of photoconductor drum 22K after the image on the drum 22K has been transferred to a belt 21, using the blade 27K.

In addition, as illustrated in FIG. 1, a toner cartridge 28 for supplying toner to developing units 24Y to 24K is provided above the image forming units 20Y to 20K. The toner cartridge 28 includes toner cartridges (28Y to 28K) of various colors including yellow (Y), magenta (M), cyan (C), and black (K).

The intermediate transfer belt 21 is suspended by a driving roller 31 and a driven roller 32 and moves in a continuous generally parallelepiped path. In addition, the intermediate transfer belt 21 is maintained in rolling contact with the rotating photoconductor drums 22Y to 22K. As illustrated in FIG. 2, the primary transfer roller 25K applies a primary transfer voltage to a position of the intermediate transfer belt 21 opposite to the photoconductor drum 22K so as to primarily transfer a toner image, formed on the photoconductor drum 22K, onto the intermediate transfer belt 21.

The driving roller 31 for suspending one end of the loop of the intermediate transfer belt 21 is arranged opposite to a secondary transfer roller 33. When a sheet S passes through a gap (pinch) between the driving roller 31 and the secondary transfer roller 33, the secondary transfer roller 33 applies a secondary transfer voltage to the sheet S. The toner image on the intermediate transfer belt 21 is then secondarily transferred onto the sheet S. A belt cleaner 34 (FIG. 1) is provided in the vicinity of the driven roller 32 of the intermediate transfer belt 21 to remove any remaining image developer from the belt before a new image is transferred thereto.

In addition, as illustrated in FIG. 1, a carrying roller 35 for carrying the sheet S fed from the sheet feeding cassette 18 is provided between the sheet feeding cassette 18 and the secondary transfer roller 33. Further, a fixing unit 36 is provided on the downstream side of the secondary transfer roller 33. In addition, a carrying roller 37 is provided on the downstream side of the fixing unit 36. The carrying roller 37 discharges the sheet S to a discharging unit 38. Further, a reversing and carrying path 39 is provided on the downstream side of the fixing unit 36. The reversing and carrying path 39 reverses the sheet S to be guided to a direction of the secondary transfer roller 33 and is used for duplex (two sided) printing on the print media.

Next, a configuration of the scanning head 19K of the optical scanning device will be described with reference to FIG. 2. The scanning head 19K is provided opposite to the photoconductor drum 22K to expose, i.e., write an image onto, the cylindrical surface of the photoconductor drum 22K. The photoconductor drum 22K is rotated at a preset rotating speed such that charge can be accumulated on a surface thereof to form the outline of the image for ultimate transfer to the print media. The photoconductor drum 22K is irradiated and exposed with light from the scanning head 19K to form an electrostatic latent image on the surface of the photoconductor drum 22K.

The scanning head 19K includes an imaging element array 50, and the imaging element array 50 is supported by a holding member 41. In addition, a support 42 is provided on the bottom of the holding member 41. LED elements 43 which are light emitting elements are arranged in the support 42. The LED elements 43 are linearly provided in the main-scanning direction (into the page of FIG. 2) at regular intervals. In addition, a substrate or "chip" (not illustrated) that includes a driver IC for controlling emission of the LED elements 43 is provided in the support 42. A specific configuration of the imaging element array 50 will be described below.

The driver IC configures a controller and generates a control signal for the scanning head 19K based on image data read by the scanner unit 15 or image data for a document created by a PC or the like, and the LED elements emit light rays having a predetermined light intensity in accordance with the control signal. The light rays emitted from the LED elements 43 enter into the imaging element array 50, pass through the imaging element array 50, are imaged on the photoconductor drum 22K, and form an image on the photoconductor drum 22K. In addition, an upper portion (emission side) of the scanning head 19K is covered with a cover glass 44.

Figure 3:
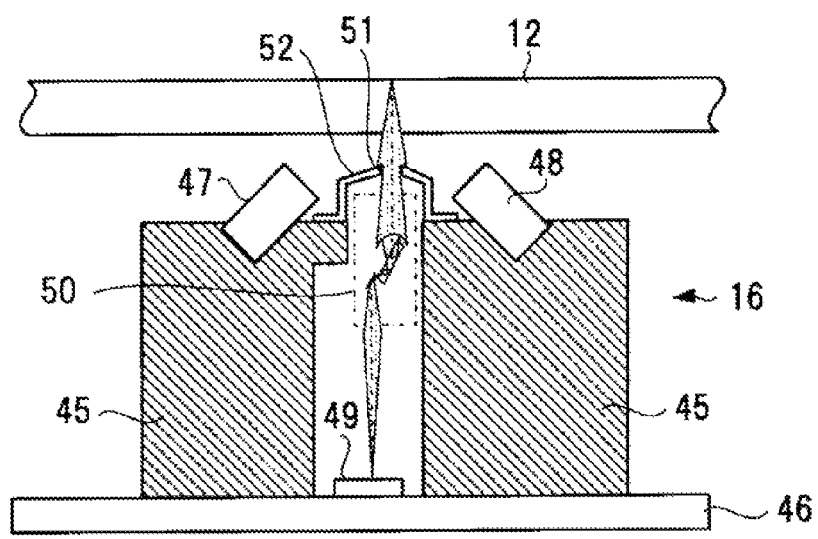
FIG. 3 is an enlarged diagram illustrating a configuration of an image reading device according to the embodiment.

FIG. 3 is a diagram illustrating a configuration of the image sensor 16 of the scanner unit 15 (reading device). The image sensor 16 reads an image of a document placed on the document plate 12 or an image of a document fed by the ADF 13 in accordance with an operation of the operation panel 14. The image sensor 16 is a one-dimensional sensor which is arranged in the main-scanning direction (extending into the page of FIG. 3) and includes a case 45.

The case 45 is arranged on the substrate 46. On an upper side of the case 45 which is located immediately below the document plate 12, two LED line illumination devices 47 and 48 for emitting light in a document direction are provided so as to extend in the main-scanning direction (depth direction in the drawing page). The LED line illumination devices 47 and 48 include LEDs and a light guiding body. The light source is not limited to an LED structure and may be a fluorescent tube, a xenon tube, a cold-cathode tube, an organic EL, or the like.

The imaging element array 50 is supported between the LED line illumination devices 47 and 48 which are positioned above the case 45. On the substrate 46 which is positioned on the bottom of the case 45, a sensor 49 configured with CCD, CMOS, or the like is mounted. In addition, a light shielding body 52 including a slit 51 is attached above the case 45.

The LED line illumination devices 47 and 48 irradiate an image reading position of the document plate 12 with light where a document may be located, and light rays reflected from the image reading position enter to the imaging element array 50 through the slit 51. The imaging element array 50 functions as an erect equal-magnification lens. The light rays incident on the imaging element array 50 are emitted from an emission surface of the imaging element array 50 and form an image on the sensor 49. That is, among the light rays irradiated from the illumination devices 47 and 48, those light rays reflected from a document which pass through the imaging element array 50. The light rays which form the image are converted into electric signals by the sensor 49, and the electric signals are transferred to a memory unit (not illustrated) of the substrate 46.

Figure 4:
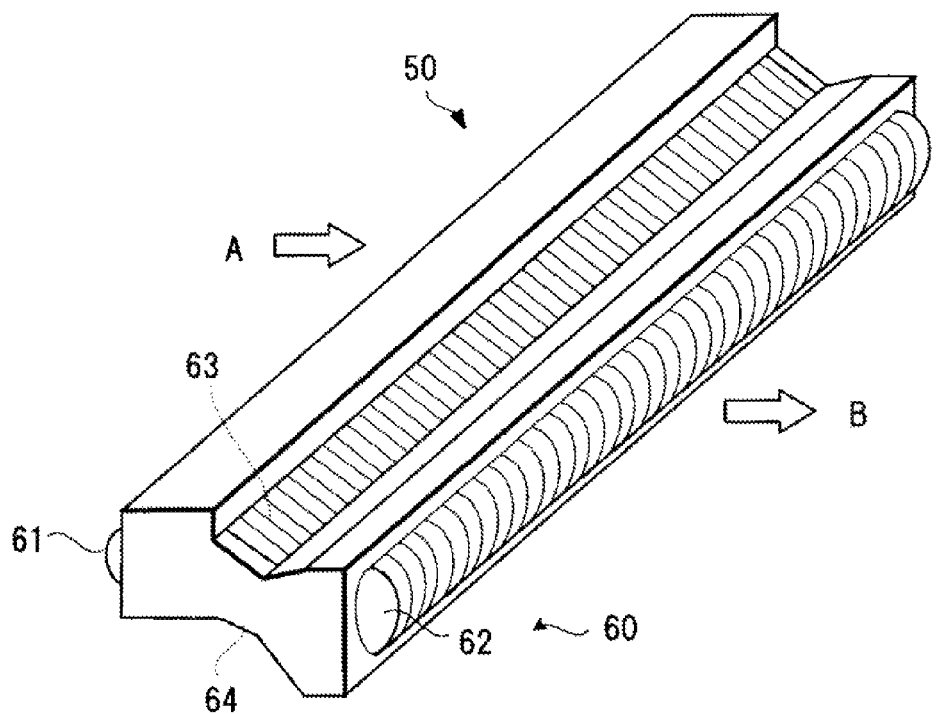
FIG. 4 is a perspective view illustrating an imaging element array according to the embodiment.

Hereinafter, the configuration of the imaging element array 50 will be described in detail. FIG. 4 is a perspective view illustrating the imaging element array 50 according to the first embodiment. An incident direction of light is indicated by arrow A, and an emission direction of light is indicated by arrow B.

The imaging element array 50 includes plural imaging elements 60, and each imaging element 60 includes a lens surface 61 which is the light incident surface, a lens surface 62 which is the light emission surface, and mirror surfaces 63 and 64 from which light rays entering from the lens surface 61 are reflected multiple times (twice in an example of FIG. 4) to the emission lens surface 62. Hereinafter, the reflective surface will be referred to as "mirror surface".

As illustrated in FIG. 4, the imaging element array 50 which is configured with the plural imaging elements 60 (imaging element group) is obtained by arranging the plural imaging elements 60 in the main-scanning direction such that the incident surfaces and the emission surfaces thereof are adjacent to each other, respectively. In addition, each of the plural imaging elements 60 are integrally formed by being molded of a resin or a glass. In the following description, the imaging element array 50 will also be simply referred to as "array 50".

In FIG. 4, the lens surface 61 is an lens surface (incident surface) which is asymmetric in a direction perpendicular to the main-scanning direction, and the lens surface 62 is a lens surface (emission surface) which is asymmetric in a direction perpendicular to the main-scanning direction. Hereinafter, the lens surface 61 and the lens surface 62 will also be referred to as "incident lens surface" and "emission lens surface", respectively.

Figure 5:
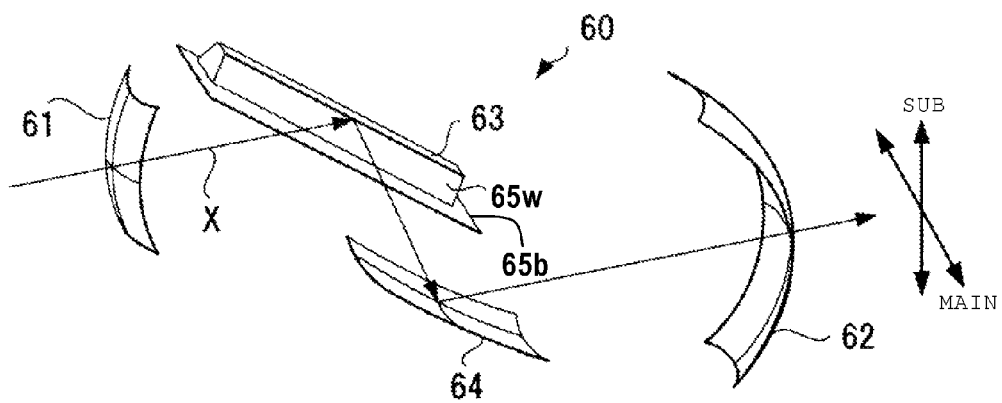
FIG. 5 is a perspective view illustrating a configuration of an imaging element according to the embodiment.

FIG. 5 is a perspective view schematically illustrating a configuration of the relative positions of the lenses and reflecting surfaces one the imaging elements 60 of the array 50. The imaging element 60 includes the incident lens surface 61, the mirror surfaces 63 and 64, and the emission lens surface 62. In FIG. 5, the lens surface 61, the mirror surfaces 63 and 64, and the lens surface 62 are separately illustrated, but this illustration is for easy understanding of the configuration of each imaging element 60. Actually, these components are integrally molded from a glass or a resin material. Incident light rays X (in FIG. 5, only a central light ray of an optical path is illustrated) enter to the lens surface 61.

In addition, as illustrated in FIG. 5, at the mirror surface 63, a reflective surface is formed on the inner surface of a convex portion 65 (see FIG. 13) which outwardly protrudes from a base 65b when seen from the incident direction of light. In addition, the convex portion 65 includes opposed walls 65w which taper inwardly in the height direction (direction extending from the body of the imaging element) of the convex portion 65.

Figure 6:
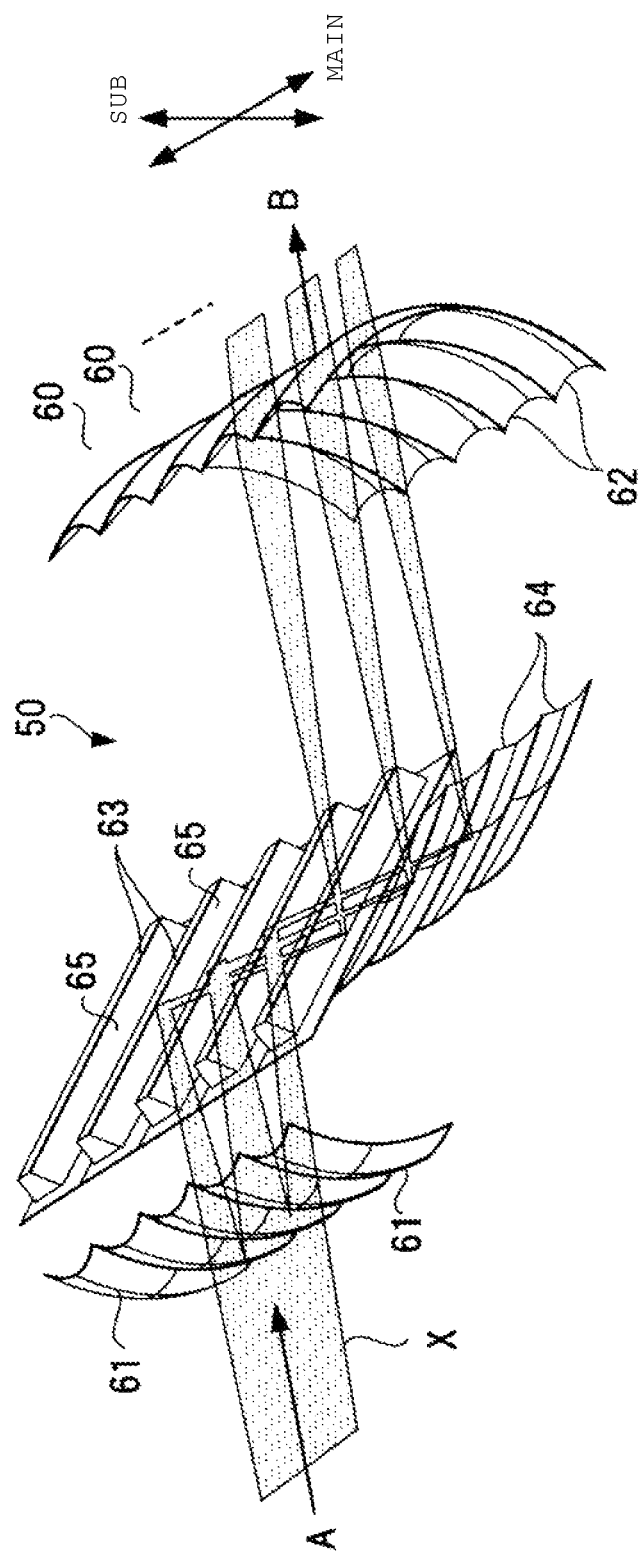
FIG. 6 is a perspective view illustrating paths of light rays of an imaging element array according to the embodiment.

FIG. 6 is a perspective view illustrating a state where the plural sets of the imaging elements 60 are arranged in a line or row. Moreover, the paths of light rays through the imaging element are illustrated, and light rays collected in each imaging element 60 contribute to image formation. When light rays incident to the incident lens surface 61 of one of the imaging elements 60 enter to another of the imaging elements 60 and reach an image plane, these light rays are considered stray light rays, which deteriorate the imaging performance of the imaging array 50. In FIGS. 5 and 6, the main-scanning direction and the sub-scanning direction are indicated by arrows "main" and "sub", respectively. In the following drawings, an arrow denoted by "main" and an arrow denoted by "sub" will indicate the main-scanning direction and the sub-scanning direction, respectively.

The light rays X incident to the imaging element array 50 enter to the lens surface 61, which is asymmetric in a direction perpendicular to the main-scanning direction, and are collected in both the main-scanning direction and the sub-scanning direction. Among the light rays, light rays contributing to image formation enter to the mirror surface 63. The mirror surface 63 is formed on the top of the convex portion 65, which outwardly protrudes from the body of the imaging element, and is arranged in the vicinity of a plane where an inverted image is formed. In addition, the mirror surface 63 reflects all the light rays incident to the mirror surface 63 and is arranged at an angle at which light rays contributing to image formation among the reflected light rays enter to the mirror surface 64 at an incident angle satisfying total reflection conditions. The mirror surface 64 is asymmetric in a direction perpendicular to the main-scanning direction.

The light rays incident to the mirror surface 64 are reflected from the mirror surface 64, are guided to the emission lens surface 62 (light ray emission surface) which is asymmetric in a direction perpendicular to the main-scanning direction, are imaged again by the lens surface 62, and form an erect equal-magnification image on an image plane. The image plane corresponds to the sensor 49 or the photoconductor drum 22.

As can be seen from FIGS. 5 and 6, in the array 50, the mirror surfaces 63 that sequentially reflect incident light rays to be guided to the lens surface 62 are adjacent to other portions of the imaging array, such as the walls and the outer surface of the imaging element adjacent to the walls are alternately arranged in the main-scanning direction, and these other portions guide incident light rays to portions of the imaging element 60 other than the next mirror surface, to portions that do not finally guide the light rays to the image plane, or to light shielding portions of the array 50.

That is, surfaces (propagation preventing surfaces) for preventing light rays other than the light rays reflected from the mirror surfaces 63 and 64 from propagating to the lens surface 62 are provided on both sides of the mirror surface 63. In FIGS. 5 and 6, the walls on either side of convex portion and adjacent to the mirror surface 63 function as the propagation preventing surfaces.

Figure 7:
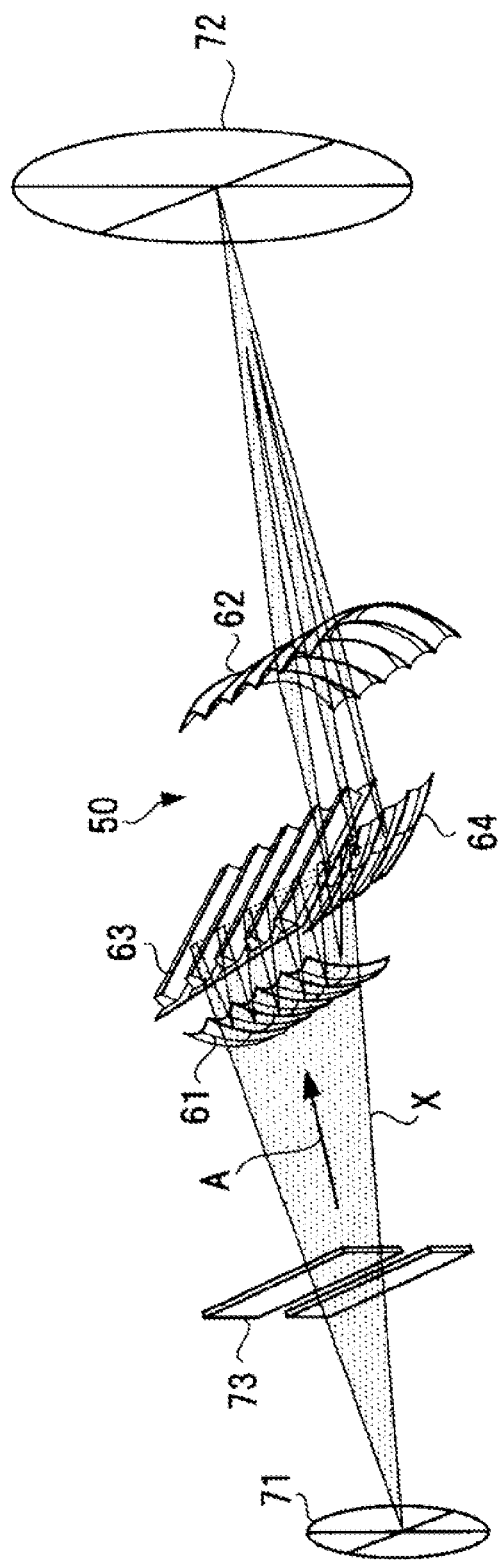
FIG. 7 is a perspective view illustrating paths of light rays from an object plane to an image plane of an imaging element array according to the embodiment.

FIG. 7 is a diagram illustrating paths of the light rays X of the imaging element array 50 which is provided between an object plane 71 and an image plane 72. A slit 73 for eliminating stray light rays from the object plane 71 is provided between the object plane 71 and the array 50. Light rays entering from the object plane 71 (LED 43 or a document placement surface of the document plate 12) are collected through (pass through) the slit 73, enter the imaging elements 60 through the lens surfaces 61 of the array 50, are reflected from the mirror surfaces 63 and 64, and are emitted from the lens surfaces 62 to form an image on the image plane 72 (the photoconductor drum 22 or the sensor 49).

FIGS. 8A to 12D are diagrams illustrating states where light rays propagate on the respective lens surfaces and the respective mirror surfaces. In FIGS. 8A to 12D, arrow A indicates a propagation direction of the light rays X.

Figure 8A:
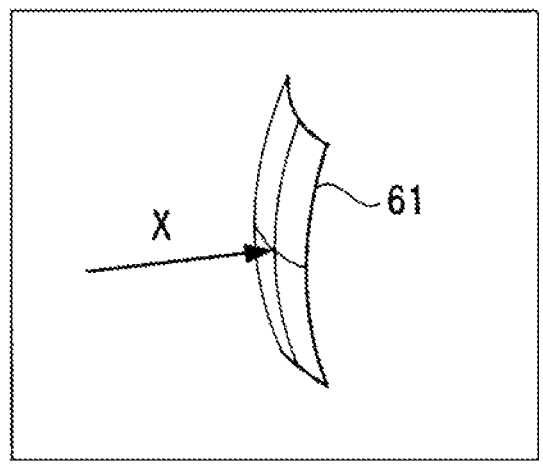
FIGS. 8A to 8D are diagrams illustrating a state where light rays propagate on a lens surface according to the embodiment.
Figure 8B:
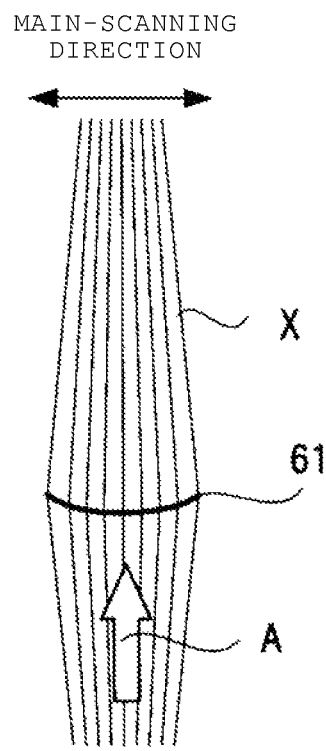
Figure 8C:
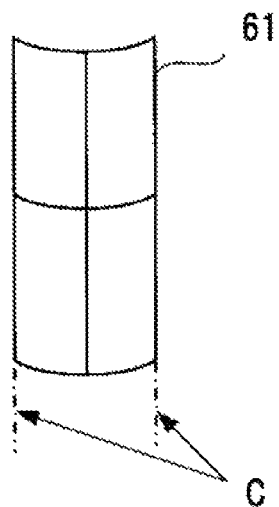
Figure 8D:
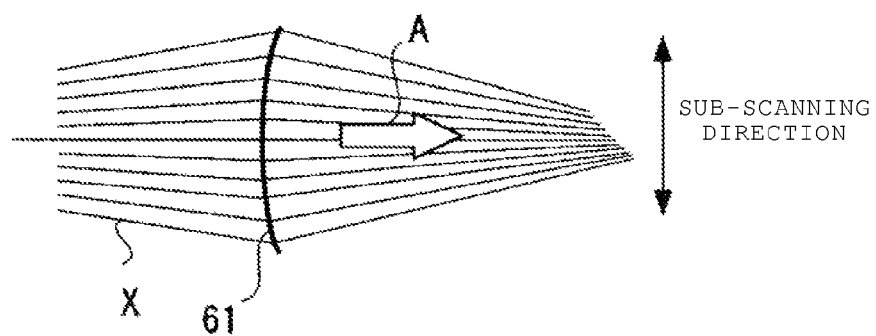

FIG. 8A is a diagram illustrating an incident direction of the light rays X passing to the lens surface 61. FIG. 8B is a diagram illustrating the light rays and the lens surface 61 when viewed from the sub-scanning direction, FIG. 8C is a diagram illustrating the lens surface 61 when viewed from the incident direction of the light rays X, and FIG. 8D is a diagram illustrating the light rays and the lens surface 61 when viewed from the main-scanning direction. The lens surface 61 has a lens surface (incident surface) which is asymmetric in a direction perpendicular to the main-scanning direction. Broken lines C of FIG. 8C indicate boundaries with adjacent imaging elements, and the boundaries form the edges of the lens surface 61 on the sides thereof. Accordingly, incident light rays to be shielded are minimized to increase an optical efficiency.

As illustrated in FIGS. 8B and 8D, the light rays X are collected in both the main-scanning direction and the sub-scanning direction, light rays emitted from an object point at a specific location are collected into one set of the imaging elements 60, and thus the intensity of light rays contributing to image formation is increased. In addition, a shape of the lens surface 61 is asymmetric in a direction perpendicular to the main-scanning direction. As a result, various aberrations caused by light rays obliquely entering to a mirror surface can be eliminated.

Figure 9A:
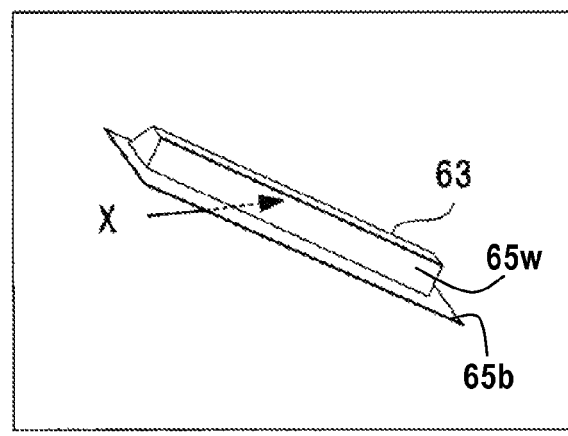
FIGS. 9A to 9D are diagrams illustrating a state where light rays propagate on a mirror surface according to the embodiment.
Figure 9B:
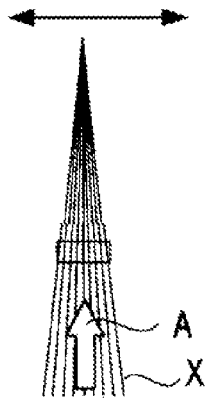
Figure 9C:
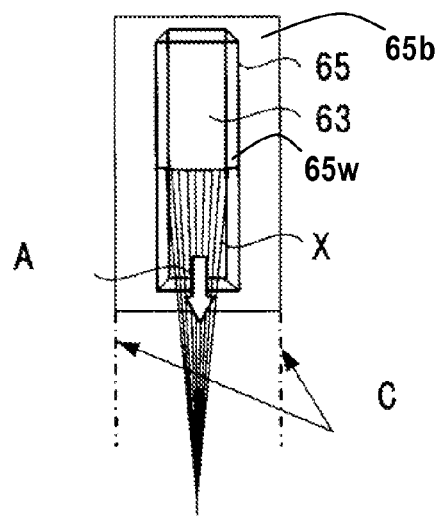
Figure 9D:
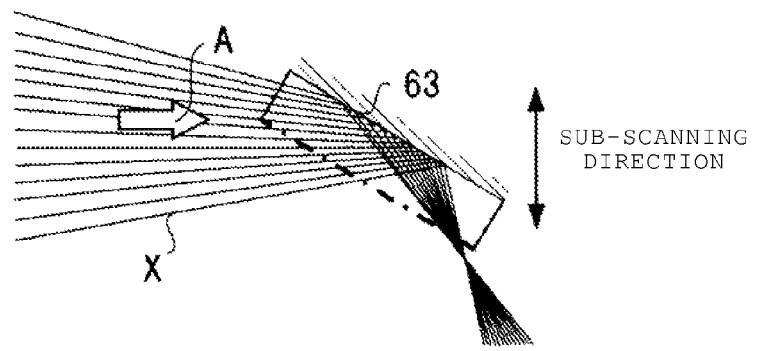

FIG. 9A is a diagram illustrating an incident direction of the light rays X to the mirror surface 63. FIG. 9B is a diagram illustrating the mirror surface 63 when viewed from the sub-scanning direction, FIG. 9C is a diagram illustrating the mirror surface 63 when viewed from the incident direction of the light rays, and FIG. 9D is a diagram illustrating the mirror surface 63 when viewed from the main-scanning direction.

The mirror surface 63 guides light rays to the next mirror surface 64. In addition, the mirror surface 63 is formed on the top of the convex portion 65 which outwardly protrudes from the body of imaging element 60. Light rays which are directed toward the mirror surface 63 at a predetermined angle or greater with respect to the main scanning direction are shielded by wall surfaces of the convex portion 65. In addition, dashed lines C of FIG. 9C indicate boundary surfaces with adjacent imaging elements 60, and regions of the outer surface of the imaging element 60 between the mirror surface 63 and the sides of the imaging element 60 at lines C function as the above-described propagation preventing surfaces. Light rays incident to these regions are guided to light shielding portions, or guided to portions other than an image plane such as a sensor surface or the photoconductor drum of a copying or printing device, such as an MFP, or are absorbed.

Figure 10A:
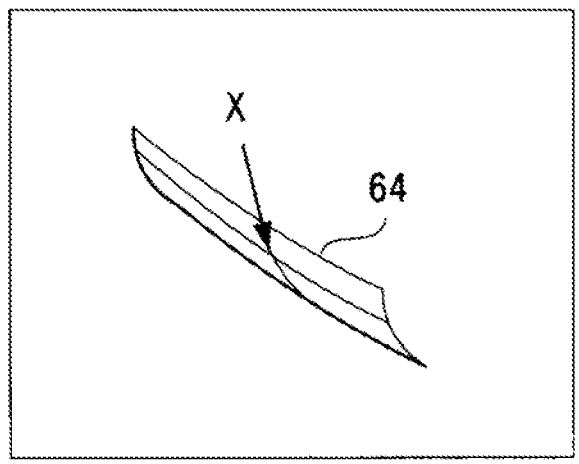
FIGS. 10A to 10D are diagrams illustrating a state where light rays propagate on another mirror surface according to the embodiment.
Figure 10B:
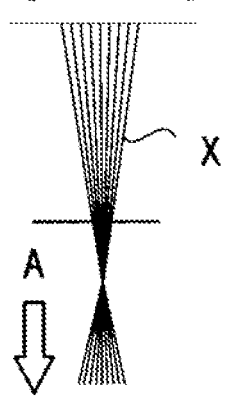
Figure 10C:
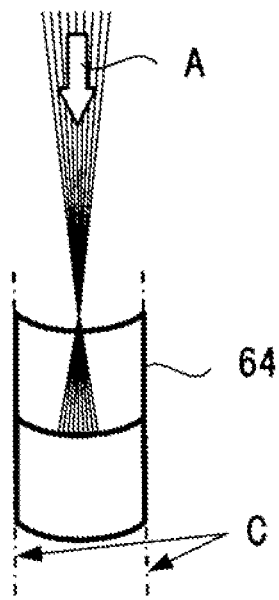

FIG. 10A is a diagram illustrating an incident direction of the light rays X directed to the mirror surface 64 from mirror surface 63. FIG. 10B is a diagram illustrating the mirror surface 64 when viewed from the sub-scanning direction, FIG. 10C is a diagram illustrating the mirror surface 64 when viewed from the incident direction of the light rays, and FIG. 10D is a diagram illustrating the mirror surface 64 when viewed from the main-scanning direction.

The mirror surface 64 which is asymmetric in a direction perpendicular to the main-scanning direction guides light rays to the next mirror surface in the same imaging element 60. Broken lines C of FIG. 10C indicate boundary surfaces (mirror edges) with mirror surfaces 64 of adjacent imaging elements 60, such that the adjacent mirror surfaces 64 are in contact with each other at their edges. As a result, incident light rays to be shielded or culled from the image plane are minimized to increase optical efficiency of the imaging element 60.

Figure 10D:
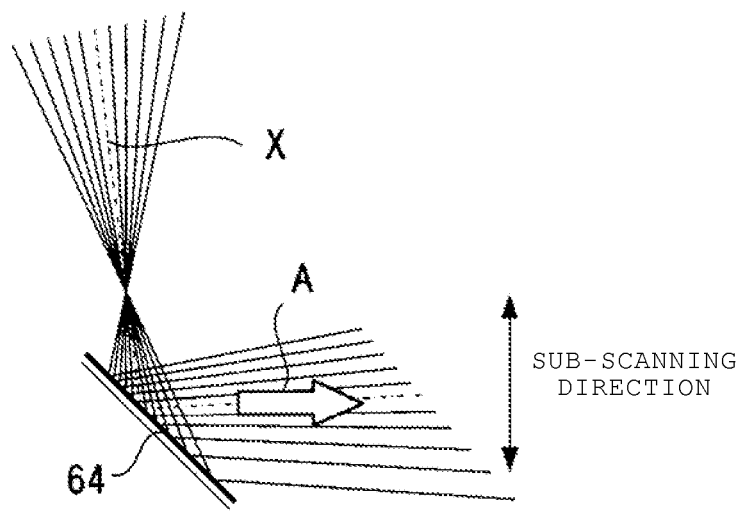

In addition, as illustrated in FIG. 10D, an intermediate inverted image plane is formed in the vicinity of the mirror surface 64. As a result, a direction in which light rays propagate to the main-scanning direction can be made to pass through the emission side lens surface 62 while suppressing various aberrations having an angled curvature.

As can be seen from FIG. 10D, immediately before light rays enter to the mirror surface 64, positions in the optical path direction where the mirror surface 64 reflects the light rays are different from each other on the left and right sides of the light rays, because of the angle of the mirror with respect to the direction of the light rays. On the left side of the figure, the mirror surface acts on the light rays on an upstream side of an optical path which is close to an intermediate image plane where an inverted image is formed. On the right side of the figure, the mirror surface acts on the light rays on an downstream side of an optical path which is distant from an intermediate image plane where an inverted image is formed.

In order to minimize a deviation in light collecting position between the left and right sides of the light rays (between the upper and lower sides of the rays in the figure after the light rays are reflected from the mirror surface 64), an absolute value of power of the left portion of mirror 64 of FIG. 10D is set to be relatively greater, and an absolute value of power of the right portion thereof of FIG. 10D is set to be relatively less than the above absolute value. Therefore, this mirror surface 64 has a shape which is asymmetric in a direction perpendicular to the main-scanning direction.

FIGS. 11A to 11D are diagrams illustrating a modification example of the mirror surface 64. The mirror surface 64 of FIGS. 11A to 11D is asymmetric in a direction perpendicular to the main-scanning direction and, when it is necessary that stray light rays be prevented from reaching the image plane over wide range of the object plane or an object height, the mirror surface of FIGS. 11A to 11D is provided instead of the mirror surface 64 of FIG. 10A to 10D in order to increase a light shielding efficiency of the imaging element.

Figure 11A:
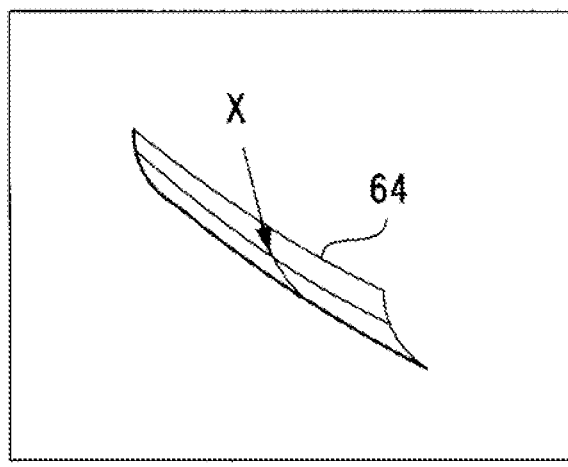
FIGS. 11A to 11D are diagrams illustrating a state where light rays propagate on a modified mirror surface.
Figure 11B:
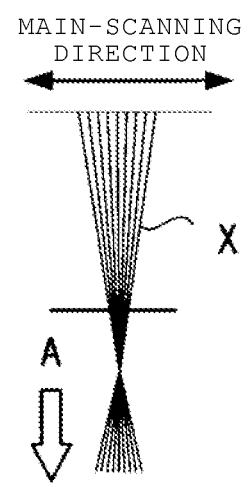
Figure 11C:
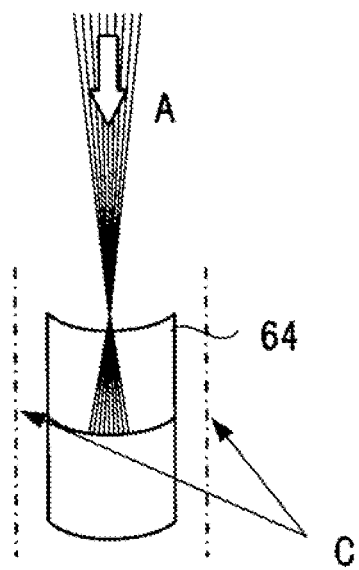
Figure 11D:
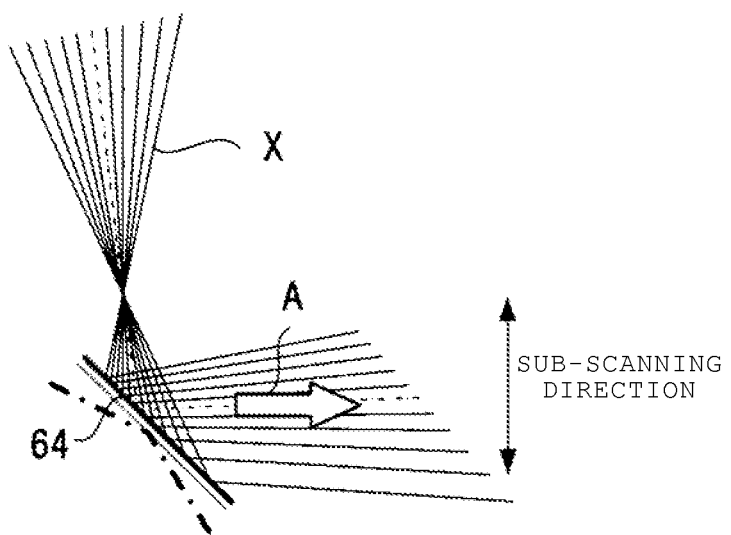

As illustrated in FIG. 11C, the mirror surface 64 of this embodiment does not extend to the edges of the imaging element 60, which are denoted by broken C, and thus the regions of the imaging element directly adjacent to the lens 64 and extending to the side surfaces of the lens as denoted by dashed lines C, also function as propagation preventing surfaces. As indicated by a dashed lines in FIG. 11D extending at an angle from the center of the underside of mirror surface 64, these propagation preventing surfaces have a position or an angle different from that of the mirror surface 64 and have a shape that finally guides light rays incident to these regions to light shielding portions or guides them to portions of the imaging element or printing device other than an image plane on a sensor surface or on the photoconductor drum.

Figure 12A:
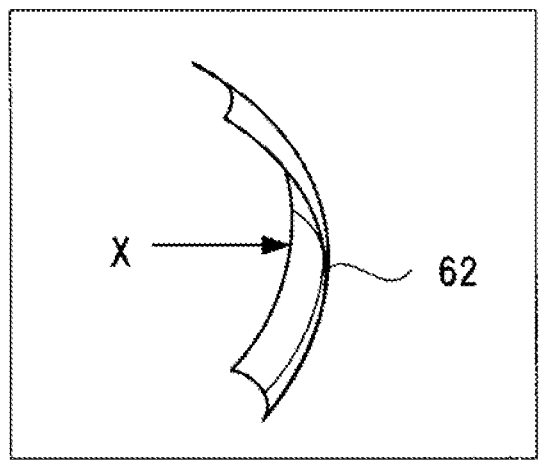
FIGS. 12A to 12D are diagrams illustrating a state where light rays propagate on another lens surface according to the embodiment.
Figure 12B:
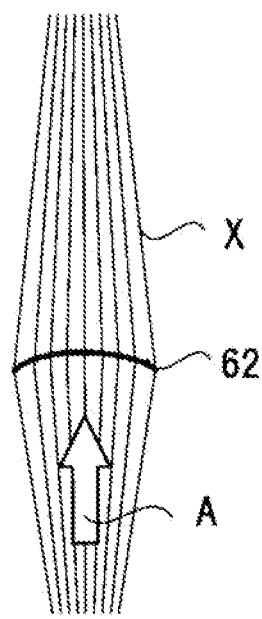

FIG. 12A is a diagram illustrating an incident direction of the light rays X to the emission lens surface 62. FIG. 12B is a diagram illustrating the emission lens surface 62 when viewed from the sub-scanning direction, FIG. 12C is a diagram illustrating the emission lens surface 62 when viewed from the incident direction of the light rays X, and FIG. 12D is a diagram illustrating the emission lens surface 62 when viewed from the main-scanning direction.

Figure 12C:
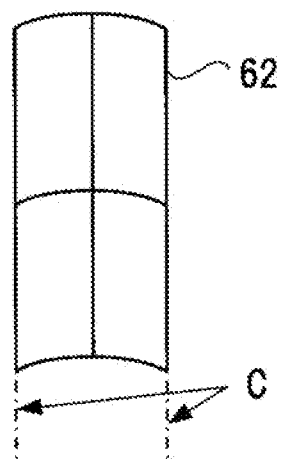
Figure 12D:
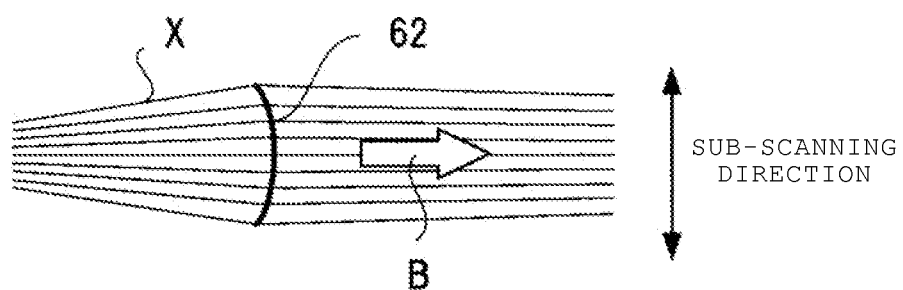

Broken lines C of FIG. 12C indicate boundary surfaces with emission lens surfaces 62 of adjacent imaging elements 60. For the emission lens surface 62, the boundaries with adjacent imaging elements form the edges of the lens. As illustrated in FIGS. 12B and 12D, the light rays are collected in both the main-scanning direction and the sub-scanning direction and form an image on an image plane such as the sensor 49 or the photoconductor drum 22. A shape of the lens surface is asymmetric in a direction perpendicular to the main-scanning direction. As a result, various aberrations caused by light rays obliquely passing through a mirror surface of the previous stage can be eliminated.

Figure 13:
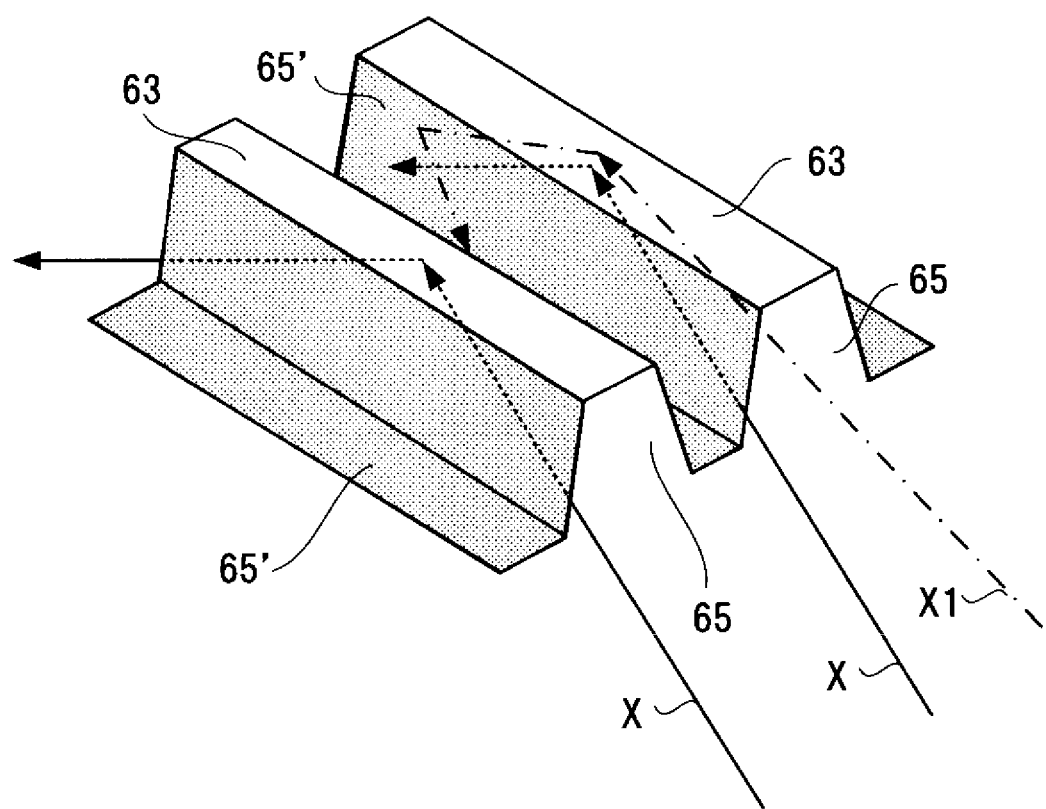
FIG. 13 is an enlarged perspective view illustrating the mirror surface according to the embodiment.

Next, the action of walls of the convex portion 65 adjacent to the mirror surface 63 will be described. FIG. 13 is an enlarged perspective view illustrating the mirror surface 63, projection, and walls, and FIG. 14 is a cross-sectional view illustrating the mirror surface 63.

The mirror surface 63 is formed on the top of the convex portion 65. The light rays X enter to the mirror surface 63 and are reflected from the mirror surface 63 to be emitted therefrom. Meanwhile, the wall surfaces of the convex portion 65 shield light rays arriving at an angle greater than a main-scanning direction angle θ. In FIG. 13, all the light rays X (solid lines) having an incident angle with respect to the main-scanning direction are reflected from the mirror surface 63 and propagate toward the next optical surface (lens surface 64), i.e. those reaching the mirror surface 63 at an angle less than θ with a plane perpendicular to the mirror surface 63 along the length direction (main scanning direction) of the imaging array. On the other hand, a light ray X1 (broken line) having an incident angle greater than θ with respect to the main-scanning direction propagates toward the convex portion 65, collides with and is reflected from a wall surface 65 of the convex portion 65, and is finally guided to a region outside an image plane (not on the sensor 49 or the photoconductor drum 22, or is absorbed within the imaging element 60).

Figure 14:
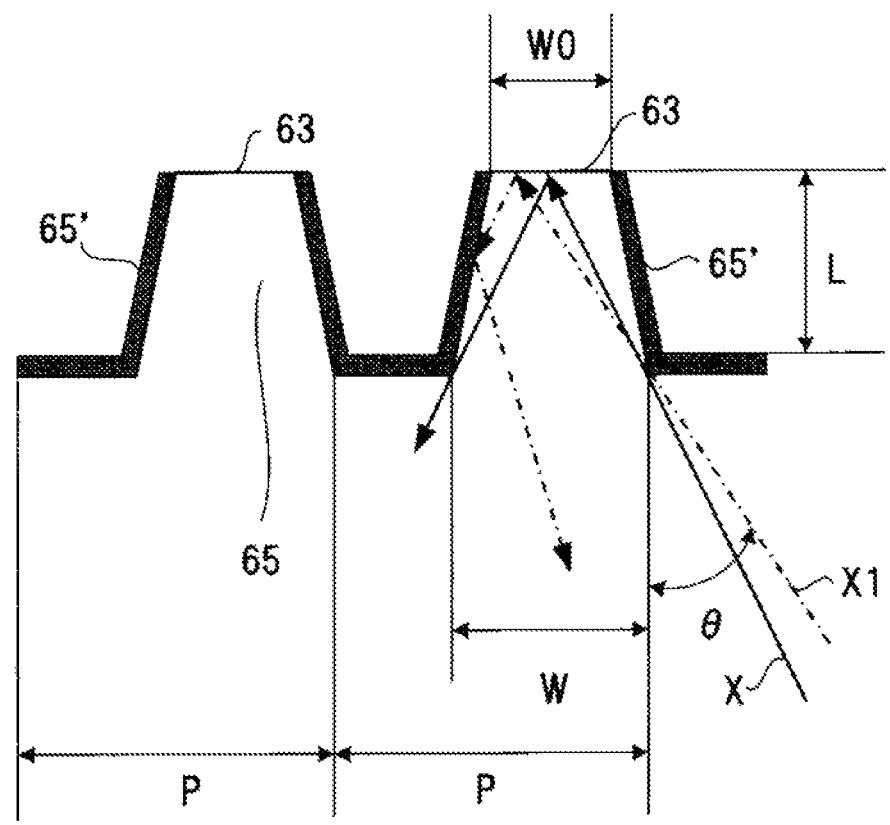
FIG. 14 is a cross-sectional view illustrating the mirror surface according to the embodiment.

As illustrated in FIG. 14, when a width of an entrance leading to the mirror surface 63 in the main-scanning direction is denoted by W and a distance from the entrance to the mirror surface 63 is denoted by L, the maximum absolute value of the incident angle θ with respect to the main-scanning direction is determined according to the following expression.

$$\tan|\theta| \le W/2/L$$

Accordingly, stray light rays can be prevented from propagating to an image plane by determining a shape of the wall surfaces of the convex portion 65 based on the above-described expression. In addition, it is preferable that a light shielding film be formed between a wall surface of the convex portion 65 and a wall surface adjacent thereto, i.e., on the outer surface of the wall and the outer surface of the imaging element between the wall and the adjacent edge of the imaging element 60. In order to form the light shielding film, for example, a light shielding ink is coated on the outer surface of the wall and the outer adjacent surface of the imaging element. By coating the walls 65w and base 65b of the imaging element 60 between the walls 65w with a light shielding ink 65', light rays which reach the wall surfaces of the convex portion 65 can be absorbed.

In FIG. 14, a width (mirror width) of the mirror surface 63 in an arrangement direction thereof is denoted by W0, and a pitch of the lens array 50 is denoted by P.

Figure 15A:
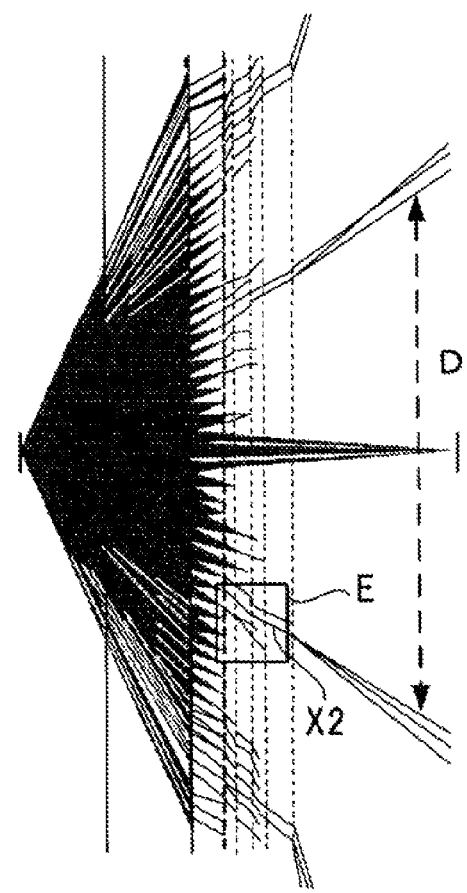
FIGS. 15A to 15C are diagrams illustrating different occurrence states of stray light depending on whether or not there is a convex portion of the mirror surface.
Figure 15B:
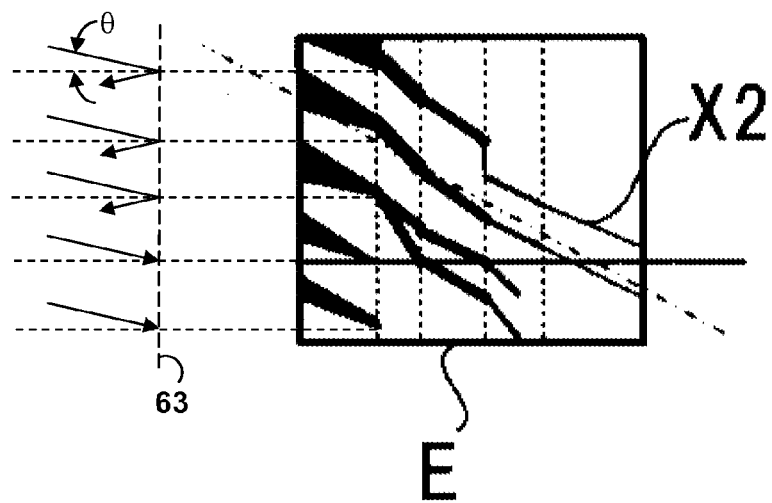
Figure 15C:
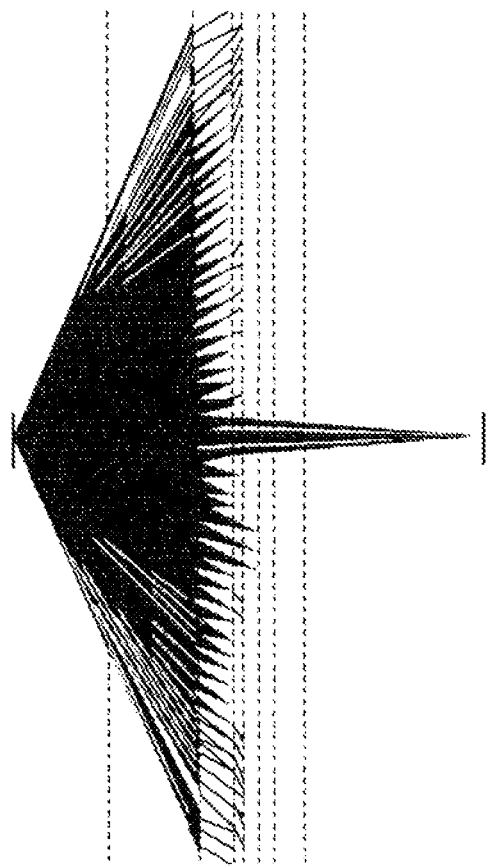

FIGS. 15A to 15C are diagrams illustrating different occurrence states of stray light depending on whether or not there is the convex portion 65. FIG. 15A is a diagram illustrating light rays emitted from the mirror surface 63 if the convex portion 65 is not present, that is, when L=0. In FIG. 15A, light rays incident to the mirror surface 63 are reflected from the mirror surface 63 and reach the image plan and thus are image forming light rays (light rays used for image formation). Among these image forming light rays, stray light rays in a certain range (range indicated by arrow D) can be eliminated without the presence of convex portion 65, but stray light rays in a wider range cannot be prevented from reaching the image plane.

FIG. 15B is an enlarged diagram illustrating the stray light portion E of FIG. 15A which is out of the range indicated by arrow D of FIG. 15A. The left half of FIG. 15B shows a reflective surface and reflected light seen from a direction parallel to the reflective surface of the mirror surface 63 and the vertical direction to main scanning direction. It can be seen that, for stray light ray X2 which is out of the range in FIG. 15A indicated by arrow D, the absolute value e' of an angle of light rays entering to or emitted from each mirror surface with respect to the main-scanning direction is greater than that of the light rays used for image formation. That is, if the convex portion 65 were provided, and light rays having a greater absolute value of an angle with respect to the main scanning direction than that of the light rays used for image formation are shielded on at least one of optical paths, stray light rays can be eliminated in the entire region.

FIG. 15C is a diagram illustrating a state of light rays emitted from the mirror surface 63 when the convex portion 65 is provided. As can be seen from FIG. 15C, stray light rays can be eliminated by providing the convex portion 65.

Figure 16A:
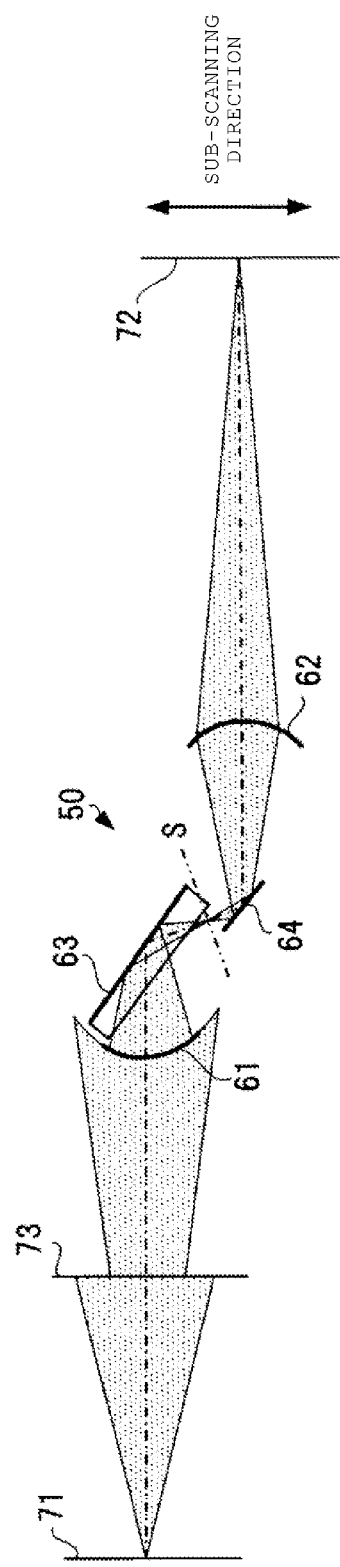
FIGS. 16A and 16B are diagrams illustrating paths of light rays of an imaging element array according to the embodiment when seen from a main-scanning direction and a sub-scanning direction.

FIG. 16A is a diagram illustrating optical paths of the array 50 when viewed from the main-scanning direction, and FIG.

Figure 16B:
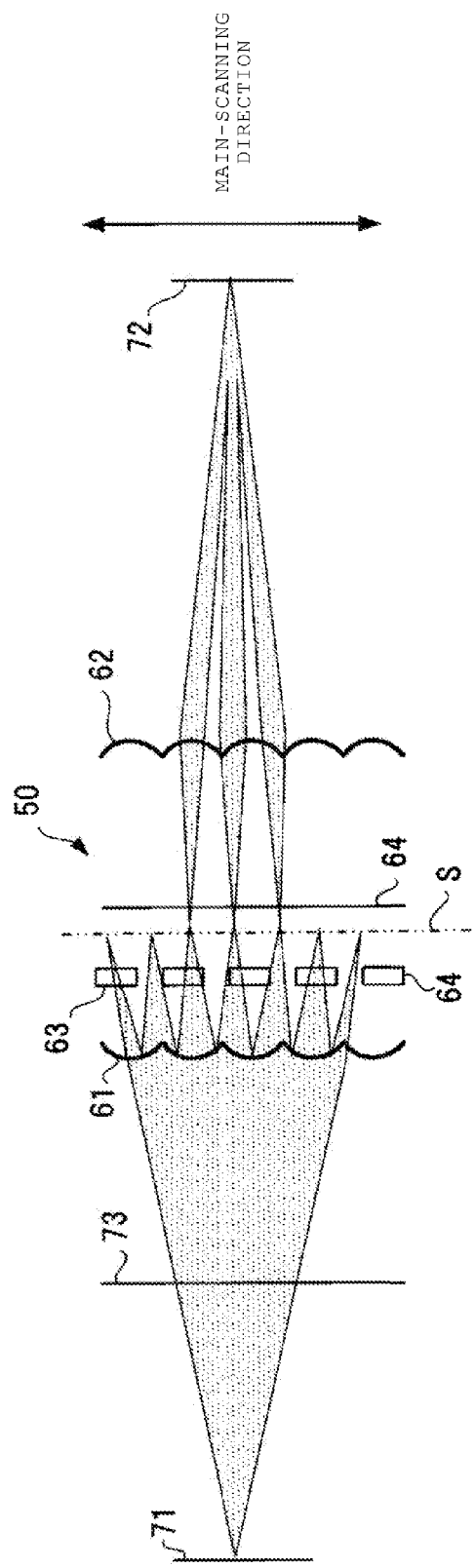

16B is a diagram illustrating optical paths of the array 50 when viewed from the sub-scanning direction. As can be seen from FIG. 16A, regarding the main-scanning direction, a light flux emitted from the object plane 71 enters the lens surface 61 after passing through the slit 73 and forms an inverted image in the vicinity of an intermediate portion (S) of the array 50 after being reflected at mirror surface 63. By inverting the inverted image again (with the mirror surface 64 and the lens surface 62), an erect image is formed on the image plane 72. In addition, as can be seen from FIG. 16B, regarding the sub-scanning direction, light rays which pass through plural sets of the imaging elements 60 may be imaged at a single point on the image plane 72.

In the above-described first embodiment, the mirror surface 63 having the convex portion 65 is provided immediately after the incident lens surface 61. As a result, since an angle of light rays, which pass through only the incident lens surface 61, is monotonously increased with respect to the main-scanning direction by increasing a distance of the main-scanning direction from an object point, and the shape of the component for dealing with all the stray light rays (for example, the projecting portion 63) can be simplified and a shape of a mold can be simplified.

In addition, since unnecessary light rays are shielded or culled before reaching the image plane on the upstream side of the optical paths, the shape of a light shielding or culling portion which is provided between mirrors on the downstream side can be simplified. However, if stray light rays pass to the downstream side of the mirror surface 63, it is hard to shield or cull all the stray light rays having a large angle with respect to the those rays intended for the image plane. Therefore, it is necessary that edges of the mirror surface 64 be formed not in a jagged shape but in a sharp shape.

Figure 17:
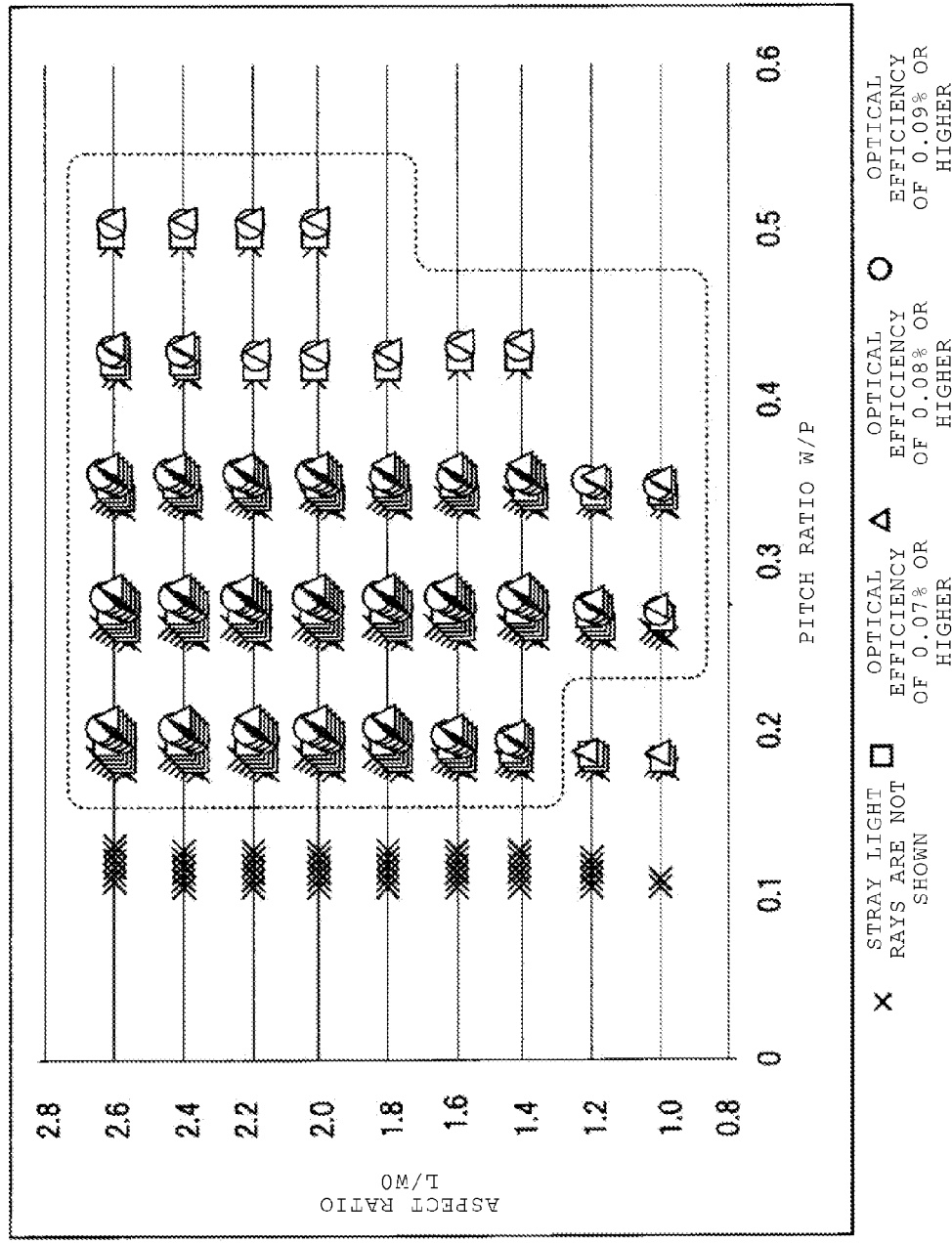
FIG. 17 is a diagram illustrating stray light characteristics of the mirror surface according to the embodiment.

FIG. 17 is a diagram illustrating stray light characteristics of the mirror surface 63 according to the first embodiment. The horizontal axis of FIG. 17 represents a value (pitch ratio: W/P) obtained by dividing the width W of the entrance of the mirror surface 63 in the main-scanning direction of FIG. 14 by the pitch P of the lens array. In addition, the vertical axis represents a value (aspect ratio: L/W0) obtained by dividing the distance L from the entrance of the mirror surface 63 to the mirror surface 63 by the mirror width W0. The calculation is performed assuming that the light shielding wall portion has a draft angle of 5° from perpendicular to the mirror surface 63.

Based on the width (entrance with: W) of the entrance of the mirror surface 63 in the main-scanning direction, light rays satisfy $L/W=(L/(W0+L\times \tan(5)*2)$ and $L/W\cong L/W0-\tan(5)*2=L/W0-0.175$.

In FIG. 17, plural array samples obtained by changing the aspect ratio (L/W0) and the pitch ratio (W/P) in stepwise manner are checked for whether or not there are stray light rays. It can be confirmed that when the aspect ratio (L/W0) is higher than or equal to 1, stray light rays are not shown; and when the aspect ratio (L/W0) is lower than or equal to 1, stray light rays are shown. In FIG. 17, a range where stray light rays are not shown is illustrated, and the number of arrays where stray light rays are not shown is plotted when the aspect ratio (L/W0) is changed from 1.0 by 0.2 and the pitch ratio (W/P) is changed from a little less than 0.1 to a little less than 0.9 by a little less than 0.1. The solution "stray light rays are not shown" is not obtained when the aspect ratio (L/W0) is less than 0.8.

In FIG. 17, x represents an imaging array where stray light rays are not shown at the image plane. For example, when the aspect ratio is 1.0 and the pitch ratio is 0.1, the number of arrays where stray light rays are not shown is only two. When the aspect ratio is high and the pitch ratio is in a range from 0.25 to 0.35, the number of arrays where stray light rays are not shown increases.

In addition, in FIG. 17, □ represents an optical efficiency of 0.07% or higher, △ represents an optical efficiency of 0.08% or higher, and ○ represents an optical efficiency of 0.09% or higher; and the number of samples where stray light rays are not shown is plotted. The optical efficiency represents, when light rays having a uniform intensity distribution are emitted in a fan shape from a certain point, what percentage of the light rays reach an image plane. The higher the percentage, the higher the optical efficiency. For example, when an optical efficiency of 0.09% is set as a condition, excellent stray light characteristics can be obtained in a range indicated by a dotted line of FIG. 17.

As illustrated in FIG. 17, when the aspect ratio (L/W0) is lower than 1 (or when a value obtained by dividing the groove depth L by the entrance width W is less than 0.825 because the entrance width is 1.0/0.825 times larger than W0), stray light rays reach the image plane. That is, it can be seen that the groove depth L is required to be greater than the mirror width W0 in order to eliminate stray light rays.

From the viewpoint of easily processing an imaging element in a mold, the lower the aspect ratio (L/W0), the more easily an imaging element can be formed in, and removed from, a mold. In addition, it can be seen that, when the pitch ratio (W/P) is a value in a range from 0.25 to 0.35, there are no stray light rays and the optical efficiency is high.

Next, an imaging element array according to a modification example of the first embodiment will be described with reference to FIGS. 18A and 18B. The imaging element array 50 of FIGS. 18A and 18B reflects light rays entering from an incident lens surface 61 plural times (twice) to be guided to an emission lens surface 62 and is obtained by interchanging the positions of the mirror surface 63 and the mirror surface 64 of the first embodiment.

Figure 18B:
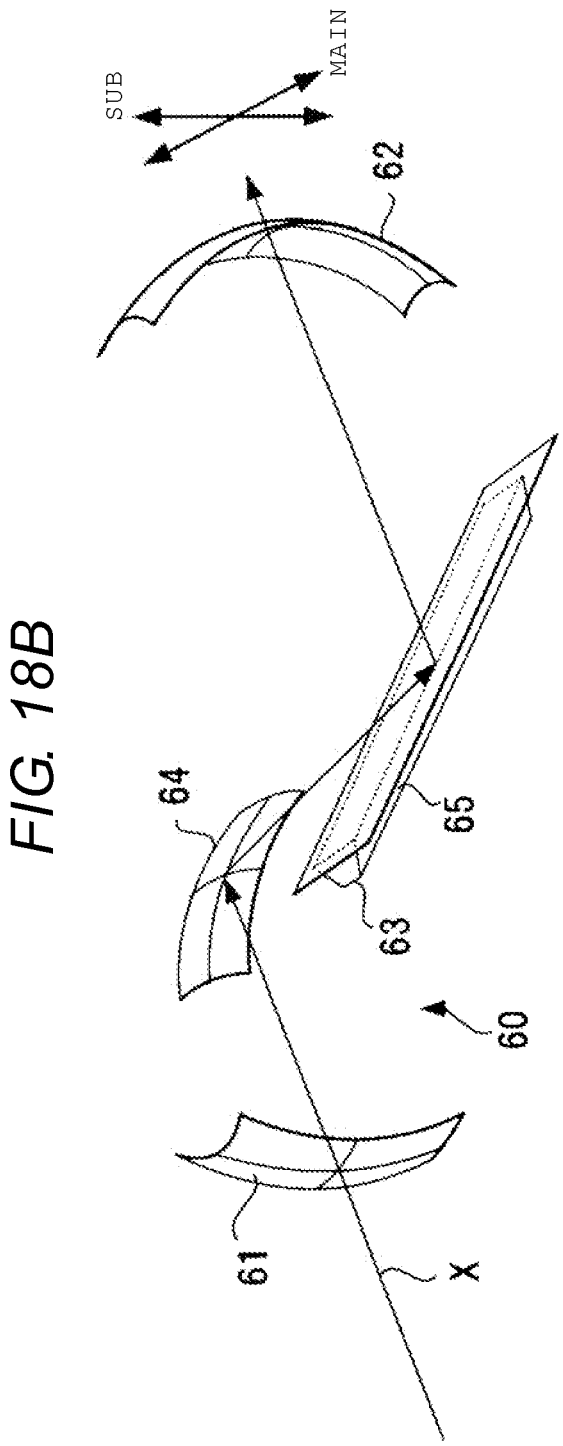

FIG. 18A is a diagram illustrating a configuration of the imaging element array 50. The imaging element array 50 includes plural imaging elements 60, and each imaging element 60 includes the lens surface 61 which is an incident surface, the lens surface 62 which is an emission surface, and mirror surfaces 64 and 63 from which light rays entering from the lens surface 61 are reflected twice to the emission lens surface 62. FIG. 18B is a diagram illustrating one imaging element 60.

In FIGS. 18A and 18B, a planar mirror surface 63 having a convex portion 65 which outwardly protrudes is arranged before the emission lens surface 62. The light rays X incident to the imaging element array 50 enter into the lens surface (incident surface) and are collected in both the main-scanning direction and the sub-scanning direction. Among the light rays, light rays contributing to image formation reach and reflect at the mirror surface 64. All the light rays incident to the mirror surface 64 are reflected, and light rays contributing to image formation among the reflected light rays reach the mirror surface 63. Further, all the light rays incident to the mirror surface 63 are reflected, and light rays contributing to image formation among the reflected light rays are guided to the lens surface 62 (emission surface), are imaged again by the lens surface 62, and form an erect equal-magnification image on an image plane, and the walls reflect stray light such that it does not reach the image plane.

Figure 19:
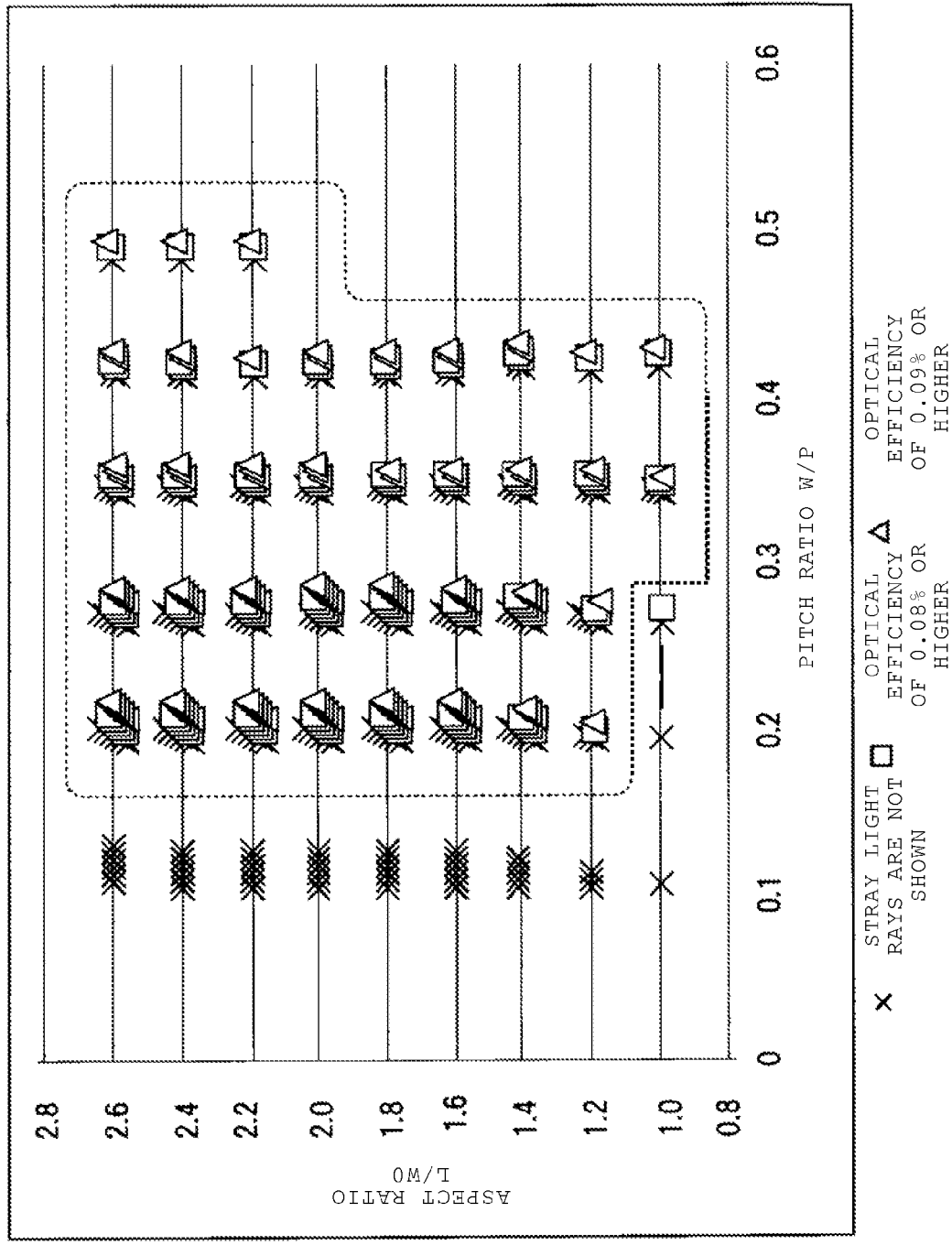
FIG. 19 is a diagram illustrating stray light characteristics of a mirror surface of the modified imaging element array.

FIG. 19 is a diagram illustrating stray light characteristics of using the mirror surface 63 as configured in the imaging apparatus 60 of FIGS. 18A and 18B. In FIG. 19, The horizontal axis represents a value (pitch ratio: W/P) obtained by dividing the entrance width W of the mirror surface 63 in FIG.

14 by the pitch P of the lens array. In addition, the vertical axis represents a value (aspect ratio: L/W0) obtained by dividing the distance L from the entrance of the mirror surface 63 to the mirror surface 63 by the mirror width W0.

In FIG. 19, x represents an array where stray light rays are not shown, □ represents an optical efficiency of 0.08% or higher, and Δ represents an optical efficiency of 0.09% or higher; and the number of samples where stray light rays are not shown is plotted.

Similarly, in FIG. 19, when the aspect ratio (L/W0) is lower than 1 (or when a value obtained by dividing the groove depth L by the entrance width W is less than 0.825), stray light rays are shown at the image plane. That is, it can be seen that the groove depth L is required to be greater than the mirror width W0 in order to eliminate stray light rays.

From the viewpoint of easily processing or manufacturing the imaging element in a mold, if the aspect ratio (L/W0) is lower, the mold can be easily produced and the imaging element 60 easily formed. In addition, it can be seen that, when the pitch ratio (W/P) is a value in a range from 0.25 to 0.43, there are no stray light rays and the optical efficiency is high. For example, when an optical efficiency of 0.09% is set as a condition, excellent stray light characteristics can be obtained in a range indicated by a dotted line of FIG. 19.

Second Embodiment

Next, an imaging element array 50 according to a second embodiment will be described. The imaging element array 50 according to the second embodiment reflects light rays entering from an incident lens surface 61 multiple times (three times) to be guided to an emission lens surface 62.

Figure 20A:
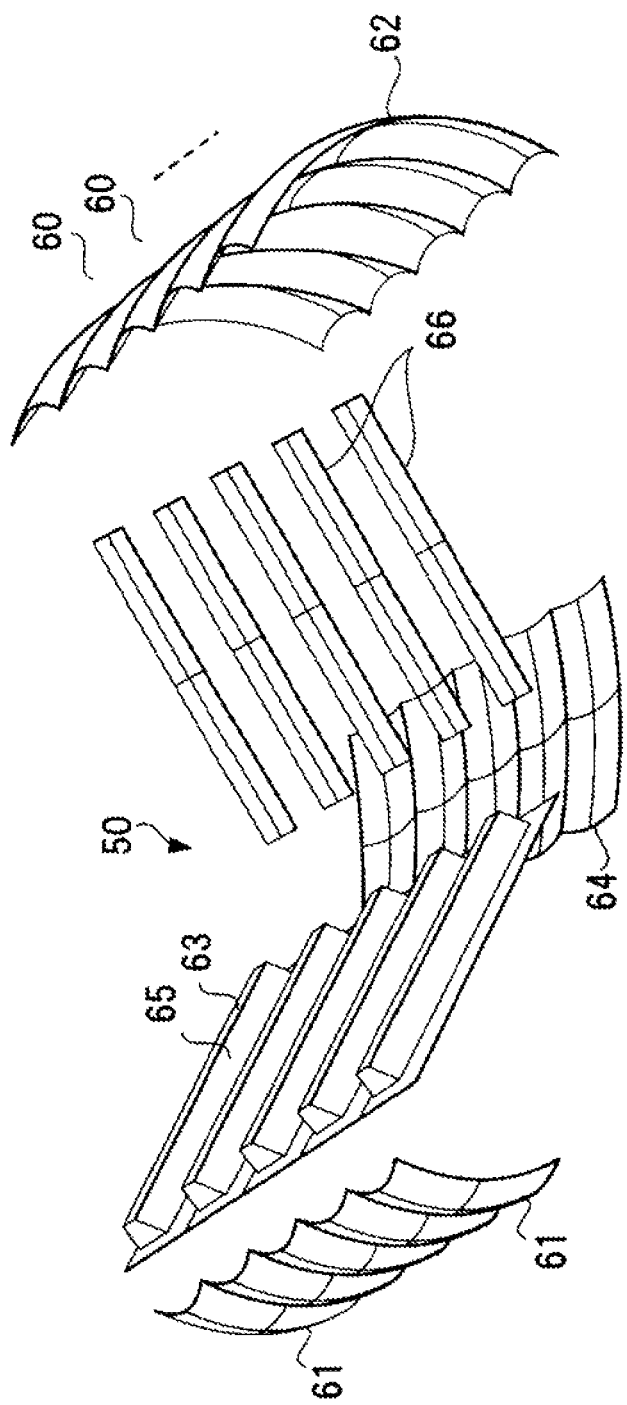
FIGS. 20A and 20B are diagrams illustrating an imaging element array according to a second embodiment.
Figure 20B:
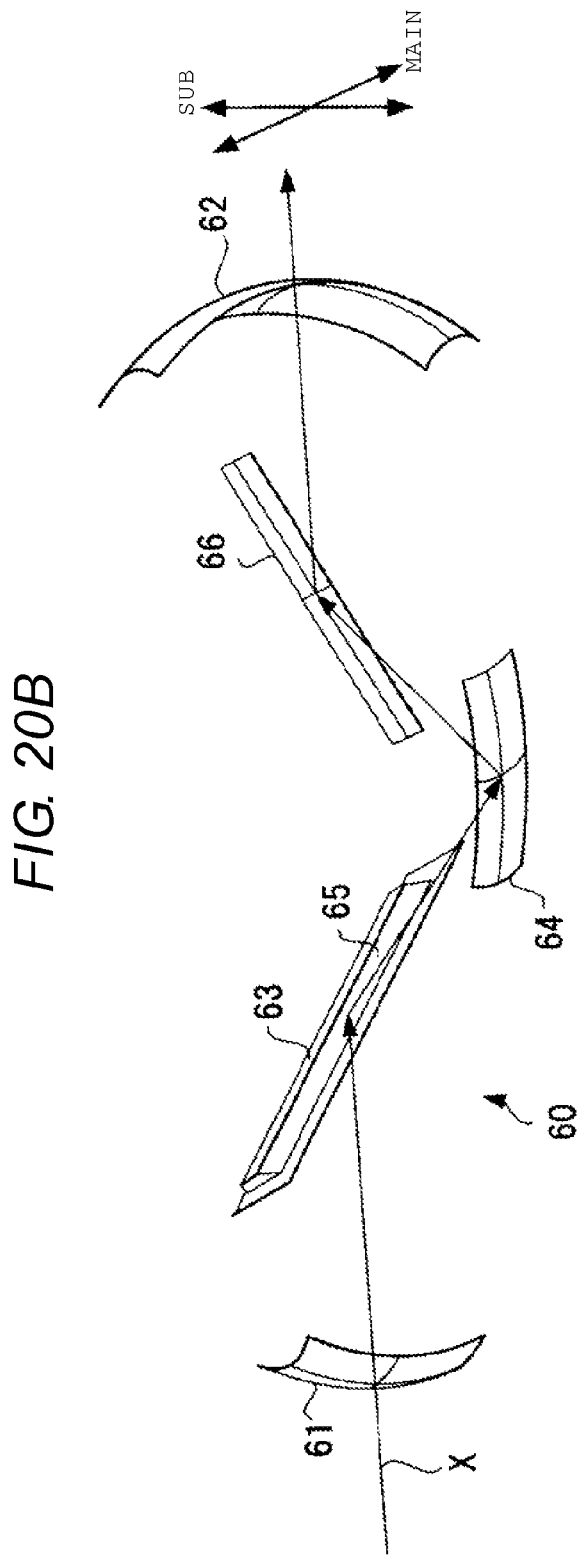

FIG. 20A is a diagram illustrating the imaging element array 50 according to the second embodiment. The imaging element array 50 according to the second embodiment includes plural imaging elements 60, and each imaging element 60 includes the lens surface 61 which is an incident surface, the lens surface 62 which is an emission surface, and mirror surfaces 63, 64, and 66 from which light rays entering from the lens surface 61 are reflected three times to the emission lens surface 62. FIG. 20B is a diagram illustrating one imaging element 60.

The mirror surface 63 is positioned at a position of the next stage of the lens surface 61 on the incident side and is a planar mirror that is formed on the top of a convex portion 65 which outwardly protrudes. The light rays X incident to the imaging element array 50 enter into the lens surface 61 (incident surface) and are collected in both the main-scanning direction and the sub-scanning direction. Among the light rays, light rays contributing to image formation pass to the mirror surface 63.

All the light rays incident to the mirror surface 63 are reflected, and light rays contributing to image formation among the reflected light rays pass to the mirror surface 64. The mirror surface 64 is in contact with other mirror surfaces 64 of adjacent imaging elements 60 at boundary surfaces (mirror edges).

All the light rays incident to the mirror surface 64 are reflected and incident to the mirror surface 66. All the light rays incident to the mirror surface 66 are reflected, and light rays contributing to image formation among the reflected light rays are guided to the lens surface 62 (emission surface), are imaged again by the lens surface 62, and form an erect equal-magnification image on an image plane. Similarly, in the mirror surface 63 of the second embodiment, the groove depth L is greater than the mirror width W0.

As a modification example of the imaging element array 50 of FIGS. 20A and 20B, a configuration may be adopted in which the mirror surface 63 is arranged in the previous stage of the emission lens surface 62, and the mirror surface 66 is arranged at the next position of the lens surface 61 on the incident side.

In addition, plural mirror surfaces may be arranged between the incident lens surface 61 and the emission lens surface 62 such that light rays entering from the incident lens surface 61 are reflected three times or more (for example, four times) to the emission lens surface 62. In this case, it is only necessary that at least one of the mirror surfaces is a planar mirror that is formed on the top of a convex portion which outwardly protrudes; and that the groove depth L is greater than the mirror width W0.

In addition, in all the embodiments, depending on the requirements, some of the mirror surfaces can have a shape which is symmetric in a direction perpendicular to the main-scanning direction. In addition, a configuration may be adopted in which the propagation preventing surfaces are not provided between some adjacent mirror surfaces and the mirror surfaces are in contact with each other.

In the embodiments, components having the same name are represented by the same reference numeral. However, the components having the same reference numeral do not necessarily have the same shape. For example, both the incident lens surface of FIG. 6 and the incident lens surface of FIGS. 20A and 20B have the same reference numeral 61, but shapes thereof are different from each other. Likewise, both the mirror surface 64 of FIG. 6 and the mirror surface 64 of FIGS. 18A and 18B have the same reference numeral, but shapes thereof are different from each other.

In the imaging element arrays according to the above-described embodiments, an erecting equal-magnification optical system, in which stray light rays are eliminated, be provided by adopting the configuration in which the groove depth L of the mirror surface 63 is greater than the mirror width W0. Accordingly, a high-quality image can be formed by applying the imaging element arrays according to the above-described embodiments to an image forming apparatus. In addition, since an array can be formed of as a single molded product, a deviation in relative position between a lens and a mirror can be suppressed. Further, since the aspect ratio (L/W0) of the convex portion required to cull or otherwise eliminate stray light at the image plane is low, molding of the imaging element 60 and preparation of a mold therefore is simple, and cost and a molding cycle time can be reduced.

In addition, in the first embodiment, since the number of lens surfaces and the number of mirror surfaces are only two, respectively, the number of mirror surfaces that have an effect on imaging characteristics is small. Further, a size of a light flux is small on surfaces having a power, and a mirror having a large area of light flux thereon is configured to have no power. Therefore, since allowable values for a position of a mirror surface and for an angle deviation are large, an optical system can be easily manufactured.

In the description of the above-described embodiments, the image forming apparatus is an MFP but is not limited thereto. Cases where the image forming apparatus is a single scanner as an image reading device and cases where the image forming apparatus is a single electrophotographic printer as an optical scanning device are also included in the category of the image forming apparatus according to the embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An imaging element array comprising:
   a plurality of imaging elements that are arranged side by side in a main-scanning direction,
   wherein each imaging element is integrally molded of one of resin and glass and includes an incident surface, an emission surface, and a plurality of reflective surfaces which is provided between the incident surface and the emission surface, and
   the imaging element includes a first reflective element having a convex portion that protrudes outwardly from a base and has reflective sidewalls extending from the base, one of the plurality of reflective surfaces disposed on a top of the convex portion, a width of the top in the main-scanning direction being less than a distance from the base to the top, the convex portion disposed such that light rays enter the base and propagate to the top.

2. The imaging element array of claim 1, further including a light absorbing material that coats the exterior of the imaging element adjacent to the sidewalls.

3. The imaging element array of claim 1, wherein the imaging element array is arranged across the main scanning direction, and includes a sub-scanning direction perpendicular to the main scanning direction, wherein at least one of the plurality of the reflective surfaces has an asymmetric shape in the sub-scanning direction.

4. The imaging element array of claim 1, wherein the first reflective element is arranged at an angle satisfying total reflection conditions with respect to all the light rays contributing to image formation.

5. The imaging element array of claim 1, wherein the first reflective element is arranged immediately adjacent to one of the incident and emission surfaces.

6. The imaging element array of claim 1, wherein the light rays are reflected three times, and the imaging element includes three reflective surfaces.

7. The imaging element array of claim 1, wherein the incident surface is a lens.

8. The imaging element array of claim 1, wherein the emission surface is a lens.

9. The imaging element array of claim 1, wherein the light rays reflecting off of the first reflective element and not further received at one of the sidewalls are included in the flux of light rays reaching the emission surface.

10. The imaging element array of claim 9, further including a light absorbing material on the sidewalls.

11. The imaging element array of claim 1, wherein the imaging element has a uniform width, and the imaging element includes a second reflective element, wherein the second reflective element does not extend the full width of the imaging element.

12. The imaging element array of claim 11, wherein the second reflective element is positioned between, in a light path direction from the incident surface to emission surface, the emission surface and the first reflective element.

13. A method of projecting an image with an imaging element from an object plane to an image plane while preventing stray light from leaving the imaging element and reaching the image plane, comprising:
   providing a single piece molded body having an light incident surface located adjacent to the object plane, an emission surface adjacent to the image plane, and at least two reflective surfaces therebetween, wherein the molded body is made of one of resin and glass;
   providing a first reflective element having a projection in which light rays propagate to an end of the projection, the projection extending outwardly of the molded body with sidewalls having an inward taper, such that an opening width of the projection is larger than width of the projection at the end of the projection wherein the length of the outward projection from the molded body is at least as large as the width of the projection at the end of the projection; and
   reflecting the light rays off the first reflective element such that the light rays reaching the first reflective element from the object plane is ultimately reflected to the image plane, and the stray light is reflected from the first reflective element and not to the image plane.

14. The method of claim 13, further including the step of receiving the light rays reflected from the first reflective element at the sidewall of the projection, and reflecting the stray light to a location other than the image plane.

15. The method of claim 13, wherein the emission surface focuses light on the image plane.

16. The method of claim 13, further including the step of absorbing stray light in a surface of the molded body located adjacent to the first reflective element.

17. The method of claim 16, further including the step of absorbing the stray light in a side wall of the projection.

18. The method of claim 13, further including the step of inverting the object image between the first reflective element and a second reflective element.

19. The method of claim 18, further including the step of again inverting the inverted image between the second reflective element and the emission surface.

20. An image forming apparatus comprising:
   an illumination device that emits light; and
   an imaging element array including
      a plurality of imaging elements that are arranged side by side in a main-scanning direction,
      wherein each imaging element is integrally molded of one of resin and glass and includes an incident surface, an emission surface, and a plurality of reflective surfaces which is provided between the incident surface and the emission surface,
      the imaging element includes a first reflective element having a convex portion that protrudes outwardly from a base and has reflective sidewalls extending from the base, one of the plurality of reflective surfaces disposed on a top of the convex portion, a width of the top in the main-scanning direction being less than a distance from the base to the top, the convex portion disposed such that light rays enter the base and propagate to the top.

* * * * *